United States Patent
Kaneda et al.

(10) Patent No.: US 11,670,765 B2
(45) Date of Patent: *Jun. 6, 2023

(54) NICKEL MANGANESE COMPOSITE HYDROXIDE, PRODUCTION METHOD FOR NICKEL MANGANESE COMPOSITE HYDROXIDE, POSITIVE ELECTRODE ACTIVE MATERIAL FOR NON-AQUEOUS ELECTROLYTE SECONDARY BATTERY, PRODUCTION METHOD FOR POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicant: SUMITOMO METAL MINING CO., LTD., Tokyo (JP)

(72) Inventors: Haruki Kaneda, Niihama (JP); Yuki Koshika, Niihama (JP); Takaaki Ando, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 1165 days.

This patent is subject to a terminal disclaimer.

(21) Appl. No.: 16/320,670

(22) PCT Filed: Jul. 28, 2017

(86) PCT No.: PCT/JP2017/027539
§ 371 (c)(1),
(2) Date: Apr. 17, 2019

(87) PCT Pub. No.: WO2018/021556
PCT Pub. Date: Feb. 1, 2018

(65) Prior Publication Data
US 2019/0296348 A1    Sep. 26, 2019

(30) Foreign Application Priority Data

Jul. 29, 2016 (JP) .............................. JP2016-150506

(51) Int. Cl.
*H01M 4/505* (2010.01)
*C01G 53/00* (2006.01)
(Continued)

(52) U.S. Cl.
CPC .......... *H01M 4/505* (2013.01); *C01G 53/006* (2013.01); *C01G 53/04* (2013.01); *H01M 4/525* (2013.01);
(Continued)

(58) Field of Classification Search
CPC .. H01M 4/505; H01M 4/525; H01M 10/0525; H01M 2004/028; C01G 53/006;
(Continued)

(56) References Cited

U.S. PATENT DOCUMENTS 6,153,334 A    11/2000  Sakamoto et al.
11,296,316 B2 *  4/2022  Kaneda ................ C01G 53/006
(Continued)

FOREIGN PATENT DOCUMENTS

CN   103797623 A   5/2014
CN   105027335 A   11/2015
(Continued)

OTHER PUBLICATIONS

International Search Report dated Sep. 5, 2017, issued in counterpart application No. PCT/JP2017/027539, with English translation. (4 pages).
(Continued)

*Primary Examiner* — Adam A Arciero
(74) *Attorney, Agent, or Firm* — WHDA, LLP

(57) ABSTRACT

Provided are a positive electrode active material that can provide a nonaqueous electrolyte secondary battery having
(Continued)

high energy density and excellent output characteristics, a nickel-manganese composite hydroxide as a precursor thereof, and methods for producing these. A nickel-manganese composite hydroxide is represented by General Formula (1): $Ni_xMn_yM_z(OH)_{2+\alpha}$ and contains a secondary particle formed of a plurality of flocculated primary particles. The nickel-manganese composite hydroxide has a half width of a diffraction peak of a (001) plane of at least 0.35° and up to 0.50° and has a degree of sparsity/density represented by [(a void area within the secondary particle/a cross section of the secondary particle)×100](%) within a range of greater than 10% and up to 25%.

16 Claims, 8 Drawing Sheets

(51) Int. Cl.
*H01M 4/525* (2010.01)
*H01M 10/0525* (2010.01)
*C01G 53/04* (2006.01)
*H01M 4/02* (2006.01)

(52) U.S. Cl.
CPC ..... *H01M 10/0525* (2013.01); *C01P 2002/52* (2013.01); *C01P 2002/74* (2013.01); *C01P 2004/50* (2013.01); *C01P 2004/51* (2013.01); *C01P 2006/11* (2013.01); *C01P 2006/12* (2013.01); *C01P 2006/14* (2013.01); *C01P 2006/40* (2013.01); *H01M 2004/028* (2013.01)

(58) Field of Classification Search
CPC .............. C01P 2002/52; C01P 2002/74; C01P 2004/50; C01P 2004/51; C01P 2006/11; C01P 2006/12; C01P 2006/14; C01P 2006/40
See application file for complete search history.

(56) References Cited

U.S. PATENT DOCUMENTS

| | | | |
|---|---|---|---|
| 11,387,453 B2* | 7/2022 | Kaneda | H01M 10/0525 |
| 2004/0110063 A1* | 6/2004 | Uchitomi | C01G 51/50 |
| | | | 429/231.1 |
| 2006/0083989 A1* | 4/2006 | Suhara | H01M 4/505 |
| | | | 429/231.95 |
| 2012/0270107 A1 | 10/2012 | Toya et al. | |
| 2015/0364759 A1 | 12/2015 | Kase et al. | |
| 2015/0364761 A1 | 12/2015 | Fukui et al. | |
| 2016/0118662 A1 | 4/2016 | Schroedle et al. | |
| 2016/0172674 A1* | 6/2016 | Oda | H01M 4/525 |
| | | | 429/223 |
| 2017/0012288 A1 | 1/2017 | Yamaji et al. | |
| 2017/0025679 A1 | 1/2017 | Kase et al. | |
| 2017/0338485 A1 | 11/2017 | Toya et al. | |
| 2018/0205080 A1 | 7/2018 | Toya et al. | |

FOREIGN PATENT DOCUMENTS

| | | | |
|---|---|---|---|
| JP | H11-317224 A | 11/1999 | |
| JP | 2001-322817 A | 11/2001 | |
| JP | 2002-304992 A | 10/2002 | |
| JP | 2005-089225 A | 4/2005 | |
| JP | 2011-116580 A | 6/2011 | |
| JP | 2013-144625 A | 7/2013 | |
| JP | 2013-246983 A | 12/2013 | |
| JP | 2015-076397 A | 4/2015 | |
| JP | 2016-522147 A | 7/2016 | |
| WO | 2015/115547 A1 | 8/2015 | |

OTHER PUBLICATIONS

International Preliminary Report on Patentability (Form PCT/IB/373) issued in counterpart International Application No. PCT/JP2017/027539 dated Jan. 29, 2019 with Form PCT/ISA/237, with English translation. (12 pages).

Office Action dated Mar. 18, 2021, issued in counterpart CN application No. 201780047283.7, with English translation. (25 pages).

* cited by examiner

NICKEL MANGANESE COMPOSITE HYDROXIDE, PRODUCTION METHOD FOR NICKEL MANGANESE COMPOSITE HYDROXIDE, POSITIVE ELECTRODE ACTIVE MATERIAL FOR NON-AQUEOUS ELECTROLYTE SECONDARY BATTERY, PRODUCTION METHOD FOR POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

TECHNICAL FIELD

The present invention relates to a nickel-manganese composite hydroxide, a method for producing the same, a positive electrode active material for a nonaqueous electrolyte secondary battery, a method for producing the same, and a nonaqueous electrolyte secondary battery.

BACKGROUND ART

In recent years, with the proliferation of portable electronic equipment such as cellular phones and notebook personal computers, development of a nonaqueous electrolyte secondary battery with reduced size and weight having high energy density is intensely demanded. A representative example of such a nonaqueous electrolyte secondary battery is a lithium ion secondary battery. For a negative electrode active material of the lithium ion secondary battery, lithium metal, lithium alloys, metal oxides, carbon, and the like are being used. These materials are materials that can de-insert and insert lithium.

Currently, research and development of lithium ion secondary batteries are being energetically conducted. Among them, lithium ion secondary batteries using lithium-transition metal composite oxides, especially a lithium-cobalt composite oxide ($LiCoO_2$), which is relatively easily synthesized, for a positive electrode active material can obtain as high voltage as 4 V class and are thus expected as batteries having high energy density and are in practical use. Also being developed are a lithium-nickel composite oxide ($LiNiO_2$), a lithium-nickel-cobalt-manganese composite oxide ($LiNi_{0.33}Co_{0.33}Mn_{0.33}O_2$), and the like using nickel, which is lower in price than cobalt, as the positive electrode active material. Among them, the lithium-nickel-cobalt-manganese composite oxide attracts attention because of its excellent balance among capacity, output characteristics, durability, costs, and the like. However, it is inferior to lithium-nickel composite oxide-based ones in capacity, and its capacity (energy density) is required to be improved.

In many cases, the positive electrode active materials are used properly depending on uses and required characteristics of lithium ion secondary batteries. In battery electric vehicle (BEV) use, for example, a long cruising distance is required, and therefore a large-capacity positive electrode active material is required. On the other hand, in plug-in hybrid electric vehicle (PHEV) use, a positive electrode active material having a good balance between battery capacity and output characteristics is required in many cases. With thus increasing varieties of batteries designed, various material designs are required also for the positive electrode active material, and as one of these requirements, required is a positive electrode active material achieving a balance between energy density and output characteristics at a high level.

Various developments have been made in response to the various requirements of material designs in the positive electrode active material. Patent Literature 1 presents a positive electrode active material for a nonaqueous electrolyte secondary battery having an average particle diameter of 2 to 8 μm and [(D90−D10)/an average particle diameter] as an indicator indicating a spread of particle size distribution of up to 0.60 in order to improve cycle characteristics and achieve high output, for example. Such an active material causes an electrochemical reaction to uniformly occur and has the advantages of high capacity and long life, but on the other hand, it is low in fillability of the active material and is thus not high in volume energy density.

Patent Literature 2 presents a method for producing a positive electrode active material for a lithium ion battery that pulverizes hydroxide raw material powder, prepares slurry containing pulverized raw material powder having specific particle size distribution, produces substantially spherical granulated powder using this slurry, mixes a lithium compound, and reacts the granulated powder and the lithium compound by firing, for example. It is said that with this process, a positive electrode active material having high open porosity with a desired porosity giving high battery characteristics can be obtained. However, a process of pulverizing the obtained hydroxide and then again granulating it to obtain a precursor is required, which is a problem in productivity. In addition, the open porosity changes by the condition of pulverization, and it cannot be said that control on the open porosity is facilitated.

Furthermore, Patent Literature 3 presents a nickel-cobalt-manganese composite hydroxide obtained by being precipitated by holding an aqueous solution containing a nickel salt, a cobalt salt, and a manganese salt at at least pH 10 and up to pH 13 in an atmosphere of a mixture gas of an inert gas and an oxygen gas with a volume ratio relative to the inert gas of at least 0.5% and up to 3.0% and a positive electrode active material for a nonaqueous electrolyte secondary battery obtained by firing a mixture of the composite hydroxide and a lithium compound, for example. It is said that with this, the tap density and the bulk density of the nickel-cobalt-manganese composite hydroxide can be improved, the positive electrode active material and a precursor thereof can be increased in density, and the capacity of a nonaqueous electrolyte secondary battery can be further improved. However, although battery capacity is studied, other battery characteristics have not been fully studied.

Patent Literature 4 presents a method for producing nickel-manganese composite hydroxide particles that supplies a raw aqueous solution containing at least nickel and manganese, an aqueous solution containing an ammonium ion supplier, and an alkali solution to a reaction tank, mixes them together to form a reaction aqueous solution, when the nickel-manganese composite hydroxide particles are crystallized, controls an oxygen concentration in the reaction tank to up to 3.0% by volume, controls the temperature of the reaction aqueous solution to 35° C. to 60° C., and controls a nickel ion concentration to at least 1,000 mg/L, for example. It is said that with this process, the circularity of the nickel-manganese composite hydroxide particles can be improved, and the fillability of a positive electrode active material the precursor of which is the nickel-manganese composite hydroxide particles can be improved. However, this presentation focuses only on fillability improved by the circularity of the particles and does not study output characteristics.

CITATION LIST

Patent Literature

[Patent Literature 1] Japanese Unexamined Patent Application Publication No. 2011-116580
[Patent Literature 2] Japanese Unexamined Patent Application Publication No. 2015-76397
[Patent Literature 3] Japanese Unexamined Patent Application Publication No. 2013-144625
[Patent Literature 4] International Publication No. WO 2015/115547

SUMMARY OF INVENTION

Technical Problem

As described above, no lithium-metal composite oxides that sufficiently satisfy the requirement of achieving a balance between energy density and output characteristics at a high level and no composite hydroxides as raw materials (precursors) of lithium-metal composite oxides have been so far developed. Furthermore, while various methods for producing the composite hydroxide (precursor) have been studied, no methods that can produce the composite hydroxide (precursor) that can sufficiently improve the performance of lithium ion secondary batteries on an industrial scale have been so far developed. Against such a background, required is development of a positive electrode active material more excellent in output characteristics while having sufficient energy density by having large capacity and high particle fillability. Also required is development of an industrially favorable method of production that can produce such a positive electrode active material at low cost and on a large scale.

In view of the above problems, an object of the present invention is to provide a positive electrode active material that, when used for a nonaqueous electrolyte secondary battery, can achieve both high energy density and excellent output characteristics at a high level and a nickel-manganese composite hydroxide as a precursor thereof. Another object of the present invention is to provide a method for producing a nickel-manganese composite hydroxide that enables easy production on an industrial scale and a method for producing a positive electrode active material for a nonaqueous electrolyte secondary battery using the nickel-manganese composite hydroxide.

Solution to Problem

The inventors of the present invention intensively studied improvement in the energy density and output characteristics of the positive electrode active material and have found out that a particle structure of the positive electrode active material has a large influence on these characteristics, that the particle structure of the positive electrode active material is largely influenced by the crystallinity and the degree of sparsity/density of a composite hydroxide as a precursor thereof, and that a dissolved nickel concentration and a dissolved oxygen concentration in a reaction aqueous solution at a crystallization process are adjusted, whereby the crystallinity and the degree of sparsity/density of the composite hydroxide to be obtained can be controlled to fall within specific ranges to complete the present invention.

A first aspect of the present invention provides a nickel-manganese composite hydroxide represented by General Formula (1): $Ni_xMn_yM_z(OH)_{2+\alpha}$ (in Formula (1), M is at least one element selected from Co, Ti, V, Cr, Zr, Nb, Mo, Hf, Ta, Fe, and W; x satisfies $0.1 \leq x \leq 0.9$, y satisfies $0.05 \leq y \leq 0.8$, z satisfies $0 \leq z \leq 0.8$, and $x+y+z=1.0$; and $\alpha$ satisfies $0 \leq \alpha \leq 0.4$) and containing a secondary particle formed of a plurality of flocculated primary particles, having a half width of a diffraction peak of a (001) plane obtained by X-ray diffraction measurement of at least 0.35° and up to 0.50° and having a degree of sparsity/density represented by [(a void area within a cross section area of the secondary particle/the cross section area of the secondary particle)×100](%) of greater than 10% and up to 22%.

A pore volume of the nickel-manganese composite hydroxide measured by a nitrogen adsorption method is preferably at least 0.03 cm³/g and up to 0.06 cm³/g. [(D90−D10)/an average particle diameter] as an indicator indicating a spread of particle size distribution of the nickel-manganese composite hydroxide is preferably at least 0.7, and the volume-average particle diameter MV is preferably at least 5 μm and up to 20 μm. A specific surface area of the nickel-manganese composite hydroxide is preferably 10 to 20 m²/g. A tap density of the nickel-manganese composite hydroxide is preferably 1.6 to 2.0 g/cm³.

A second aspect of the present invention provides a method for producing a nickel-manganese composite hydroxide represented by General Formula (1): $Ni_xMn_yM_z(OH)_{2+\alpha}$ (in Formula (1), M is at least one element selected from Co, Ti, V, Cr, Zr, Nb, Mo, Hf, Ta, Fe, and W; x satisfies $0.1 \leq x \leq 0.9$, y satisfies $0.05 \leq y \leq 0.8$, z satisfies $0 \leq z \leq 0.8$, and $x+y+z=1.0$; and $\alpha$ satisfies $0 \leq \alpha \leq 0.4$) and containing a secondary particle formed of a plurality of flocculated primary particles, the method including a crystallization process of generating a nickel-manganese composite hydroxide by neutralizing a salt containing at least nickel and a salt containing at least manganese in a reaction aqueous solution, in the crystallization process, a dissolved oxygen concentration in the reaction aqueous solution being adjusted to fall within a range of greater than 4.6 mg/L and up to 6.0 mg/L, and a dissolved nickel concentration in the reaction aqueous solution being adjusted to fall within a range of at least 300 mg/L and up to 800 mg/L.

In the crystallization process, stirring power is preferably adjusted to fall within a range of at least 2.0 kW/m³ and up to 13.0 kW/m³. In the crystallization process, the temperature of the reaction aqueous solution is preferably adjusted to fall within a range of at least 35° C. and up to 60° C. In the crystallization process, a pH value measured with a liquid temperature of the reaction aqueous solution of 25° C. as a basis is preferably adjusted to fall within a range of at least 10.0 and up to 13.0. The crystallization process preferably includes overflowing slurry containing nickel-manganese composite hydroxide particles generated through neutralization by continuously adding a mixed aqueous solution containing nickel and manganese to a reaction tank and collecting the particles.

A third aspect of the present invention provides a positive electrode active material for a nonaqueous electrolyte secondary battery, the positive electrode active material including a lithium-nickel-manganese composite oxide represented by General Formula (2): $Li_{1+t}Ni_xMn_yM_zO_{2+\beta}$ (in Formula (2), M is at least one element selected from Co, Ti, V, Cr, Zr, Nb, Mo, Hf, Ta, Fe, and W; t satisfies $-0.05 \leq t \leq 0.5$, x satisfies $0.1 \leq x \leq 0.9$, y satisfies $0.05 \leq y \leq 0.8$, z satisfies $0 \leq z \leq 0.8$, and $x+y+z=1.0$; and $\beta$ satisfies $0 \leq \beta \leq 0.5$) and containing a secondary particle formed of flocculated primary particles, the positive electrode active material for a nonaqueous electrolyte secondary battery having a degree of sparsity/density represented by [(a void area within a cross section area of the secondary particle/the cross section area of the secondary particle)×100](%) of at least 10% and up to 25% and having a DBP absorption amount measured in compliance with JIS K6217-4:2008 of greater than 20 cm$^3$/100 g and up to 28 ml/100 g.

A fourth aspect of the present invention provides a method for producing a lithium-nickel-manganese composite oxide represented by General Formula (2) $Li_{1+t}Ni_xM_yM_zO_{2+\beta}$ (in Formula (2), M is at least one element selected from Co, Ti, V, Cr, Zr, Nb, Mo, Hf, Ta, Fe, and W; t satisfies $-0.05 \le t \le 0.5$, x satisfies $0.1 \le x \le 0.9$, y satisfies $0.05 \le y \le 0.8$, z satisfies $0 \le z \le 0.8$, and x+y+z=1.0; and β satisfies $0 \le \beta \le 0.5$) and containing a secondary particle formed of flocculated primary particles, the method including a process of obtaining a mixture by mixing the nickel-manganese composite hydroxide and a lithium compound together and a process of obtaining a lithium-nickel-manganese composite oxide by firing the mixture.

In the method for producing a positive electrode active material for a nonaqueous electrolyte secondary battery, the nickel-manganese composite hydroxide is preferably obtained by the method for producing a nickel-manganese composite hydroxide.

A fifth aspect of the present invention provides a nonaqueous electrolyte secondary battery containing the positive electrode active material for a nonaqueous electrolyte secondary battery in a positive electrode.

According to the present invention, a positive electrode active material that, when used for a nonaqueous electrolyte secondary battery, can achieve both high energy density and excellent output characteristics at a high level and a nickel-manganese composite hydroxide as a precursor thereof can be obtained. The method of production of the present invention can easily produce the positive electrode active material and the nickel-manganese composite hydroxide as the precursor thereof on an industrial scale and is of extremely high industrial value.

DESCRIPTION OF EMBODIMENTS

Figure 1:
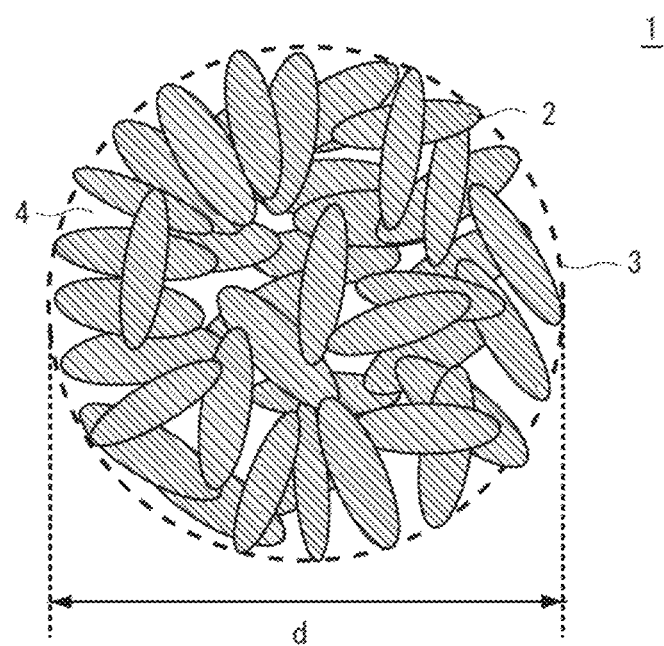
FIG. 1 is a schematic diagram of an exemplary nickel-manganese composite hydroxide.

The following describes details of a method for producing a nickel-manganese composite hydroxide, a nickel-manganese composite hydroxide obtained by the method of production, and a method for producing a positive electrode active material for a nonaqueous electrolyte secondary battery using the nickel-manganese composite hydroxide of the present embodiment with reference to the accompanying drawings. In the drawings, to make components easier to understand, they are illustrated with a part emphasized or with a part simplified, and actual structures or shapes, a reduced scale, and the like may be different.

(1) Nickel-Manganese Composite Hydroxide

FIG. 1 is a schematic diagram of an exemplary nickel-manganese composite hydroxide of the present embodiment. As illustrated in FIG. 1, this nickel-manganese composite hydroxide (hereinafter, also referred to as a "composite hydroxide") 1 is containing a secondary particle 3 formed of a plurality of flocculated primary particles 2. The secondary particle 3 has a void 4 among the primary particles 2. Although the composite hydroxide 1 mainly includes the secondary particle 3 formed of the flocculated primary particles 2, it may contain a small number of single primary particles 2 such as a primary particle 2 that has not been flocculated as the secondary particle 3 and a primary particle 2 that has fallen from the secondary particle 3 after being flocculated.

As described below, the composite hydroxide 1 has precisely controlled crystallinity and degree of sparsity/density to specific ranges with the dissolved oxygen concentration and the dissolved nickel concentration in a reaction aqueous solution and preferably stirring power adjusted during a crystallization reaction, whereby a nonaqueous electrolyte secondary battery (hereinafter, also referred to as a "secondary battery") containing a positive electrode active material for a nonaqueous electrolyte secondary battery (hereinafter, also referred to as a "positive electrode active material") using the composite hydroxide 1 as a precursor achieves both high energy density and excellent output characteristics at a high level.

The composite hydroxide 1 is represented by General Formula (1): $Ni_xMn_yM_z(OH)_{2+\alpha}$; in Formula (1), M is at least one element selected from Co, Ti, V, Cr, Zr, Nb, Mo, Hf, Ta, Fe, and W; x satisfies $0.1 \le x \le 0.9$, y satisfies $0.05 \le y \le 0.8$, z satisfies $0 \le z \le 0.8$, α satisfies $0 \le \alpha \le 0.4$, and x+y+z=1.0. In Formula (1), α is a coefficient that changes in accordance with the valence number of the metal elements contained in the composite hydroxide 1.

In Formula (1), when y indicating the content of Mn in the composite hydroxide 1 is within the above range, the morphology of the primary particles 2 can be adjusted in accordance with the dissolved oxygen concentration in the reaction aqueous solution in the crystallization process, whereby the degree of sparsity/density can be controlled to fall within a desired range. In view of controlling the degree of sparsity/density more precisely, y preferably satisfies $0.1 \le y \le 0.8$. When the value of y is at least 0.2, the degree of sparsity/density of the secondary particle 3 can be controlled at a lower dissolved oxygen concentration, and thus excessive oxidation of transition metals can be prevented. When in Formula (1) z indicating the content of M is greater than 0, requirements for various battery characteristics can be satisfied. M containing Co gives more excellent battery capacity and output characteristics, for example. When M is Co, z preferably satisfies $0.1 \le z \le 0.4$.

The composite hydroxide 1 has a half width of a diffraction peak of a (001) plane obtained by XRD measurement of at least 0.35° and up to 0.50° and preferably of at least 0.35° and up to 0.45°. When the half width of the (001) plane, which is a factor having an influence on the size, orientation, and the like of crystallites forming the composite hydroxide 1, is controlled to fall within the above range, the primary particles are appropriately grown to strike a balance between the degree of sparsity/density and particle density, whereby both high energy density and excellent output characteristics can be achieved when the composite hydroxide 1 is made into the positive electrode active material. When the half width of the (001) plane is less than 0.35°, the positive electrode active material to be obtained is likely to be dense particles and may degrade in output characteristics. In addition, when the positive electrode active material is obtained, reactivity between the composite hydroxide and a lithium compound may degrade, and the positive electrode active material having desired characteristics cannot necessarily be obtained. In contrast, when the half width of the (001) plane is greater than 0.50°, the positive electrode active material to be obtained is likely to be sparse particles and may reduce in energy density. The diffraction peak of the (001) plane appears near $2\theta=19°$ ($2\theta=19\pm1°$).

The composite hydroxide 1 has a degree of sparsity/density obtained from an image analysis result of a particle section SEM image thereof of greater than 10% and up to 22%, preferably of at least 12% and up to 22%, and more preferably of at least 15% and up to 20%. When the degree of sparsity/density is within the above range, the positive electrode active material having high output characteristics, excellent in battery capacity and fillability, and having high volume energy density can be obtained. When the degree of sparsity/density is up to 10%, when the composite hydroxide 1 is made into the positive electrode active material, particles are dense, and output characteristics are likely to degrade. In addition, when the positive electrode active material is obtained, the penetration of the Li compound into the particles is insufficient, and reactivity with the lithium compound is likely to degrade. When the degree of sparsity/density is greater than 22%, the fillability of the composite hydroxide 1 and the fillability of the positive electrode active material obtained using this composite hydroxide 1 are likely to degrade, and high volume energy density cannot necessarily be obtained when the composite hydroxide 1 is made into the positive electrode active material, although output characteristics are high.

The "degree of sparsity/density" is a value obtained from a result of image analysis of a SEM image of a section of a composite hydroxide 1 particle, for example, and is a value represented by [(the area of the void 4 within the secondary particle 3/the cross section area of the secondary particle 3)×100](%). In the section of the composite hydroxide 1 particle illustrated in FIG. 1, for example, the degree of sparsity/density is a value represented by [(the area of the void 4/the sum of the cross section area of the primary particles 2 and the area of the void 4)×100]. That is to say, a higher degree of sparsity/density gives the inside of the secondary particle 3 a sparser structure, and a lower degree of sparsity/density gives the inside of the secondary particle 3 a denser structure. For the degree of sparsity/density, sections of 20 secondary particles 3 that are at least 80% of a volume-average particle diameter (MV) are selected, the degrees of sparsity/density of the respective sections are measured, and an average degree of sparsity/density can be used as an average thereof.

The composite hydroxide 1 preferably has a pore volume measured by a nitrogen adsorption method of at least 0.03 cm$^3$/g and up to 0.06 cm$^3$/g. When the pore volume is within the above range, reactivity with the lithium compound when the positive electrode active material is obtained is excellent, and the output characteristics and fillability of the positive electrode active material to be obtained can be excellent with a good balance.

The particle diameter of the composite hydroxide 1 is not limited to a particular value and can be within a desired range. The volume-average particle diameter MV is preferably at least 5 μm and up to 20 μm and more preferably at least 6 μm and up to 15 μm when the composite hydroxide 1 is used for a precursor of the positive electrode active material. When the average particle diameter is less than 5 μm, the fillability of the composite hydroxide 1 considerably degrades, and it is difficult to increase battery capacity per volume when the composite hydroxide 1 is made into the positive electrode active material. In contrast, when the average particle diameter is greater than 20 μm, a specific surface area reduces, and thus reactivity with a lithium raw material when the composite hydroxide 1 is made into the positive electrode active material degrades, and the positive electrode active material having high battery characteristics may not be obtained, although fillability does not considerably degrades. In this case, further, the synthesized positive electrode active material degrades in cycle characteristics and reduces in an interface with an electrolyte solution, and thus positive electrode resistance increases, and battery output characteristics may degrade.

The composite hydroxide 1 preferably has [(D90−D10)/an average particle diameter] as an indicator indicating a spread of particle size distribution of at least 0.7. This can improve particle fillability and further increase the volume energy density. [(D90−D10)/the average particle diameter] can be adjusted to fall within the range by mixing composite hydroxides 1 having different particle diameters together or by producing the composite hydroxide 1 using a continuous crystallization process, for example. The upper limit of [(D90−D10)/the average particle diameter], which is not limited to a particular value, is preferably up to 1.2 and more preferably up to 1.0, for example, in view of inhibiting excessive mixing of fine particles or coarse particles into the positive electrode active material.

In [(D90−D10)/the average particle diameter], D10 means a particle diameter at which, when the numbers of particles of the respective particle diameters are accumulated from a smaller particle diameter, the accumulated volume reaches 10% of the total volume of all the particles, and D90 means a particle diameter at which, when the numbers of particles are accumulated similarly, the accumulated volume reaches 90% of the total volume of all the particles. The average particle diameter is the volume-average particle diameter MV, which means an average particle diameter weighted in terms of volume. The volume-average particle diameter MV, and D90 and D10 can be measured using a laser diffraction/scattering particle size analyzer.

The composite hydroxide 1 has a specific surface area preferably within a range of at least 10 m$^2$/g and up to 20 m$^2$/g and more preferably within a range of at least 12 m$^2$/cm$^3$ and up to 18 m$^2$/cm$^3$. When the specific surface area is within the above range, the positive electrode active material obtained by using the composite hydroxide 1 as a precursor is more excellent in a balance between charging and discharging capacity (hereinafter, also referred to as "battery capacity") and output characteristics when used for a secondary battery. The specific surface area can be made within the above range by adjusting the particle size distribution including the average particle diameter or the degree of sparsity/density of the composite hydroxide 1.

The composite hydroxide 1 has a tap density preferably within a range of at least 1.2 g/cm$^3$ and up to 2.2 g/cm$^3$ and more preferably of at least 1.5/cm$^3$ and up to 2.0 g/cm$^3$. When the tap density is within the above range, the positive electrode active material using the composite hydroxide 1 as a precursor is more excellent in fillability, achieving both improvement in battery capacity and output characteristics.

The tap density can be made within the above range by adjusting the particle size distribution including the average particle diameter or the degree of sparsity/density of the composite hydroxide 1.

(2) Method for Producing Nickel-Manganese Composite Hydroxide

Figure 2:
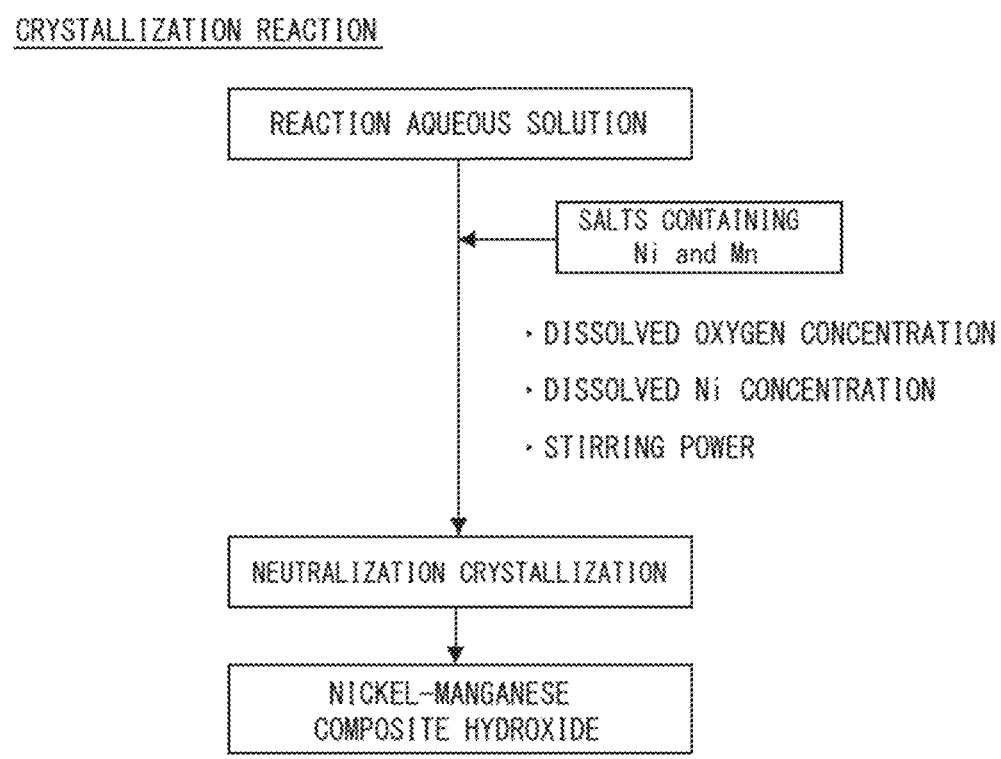
FIG. 2 is a diagram of an exemplary method for producing a nickel-manganese composite hydroxide.

FIG. 2 is a diagram of an exemplary method for producing a nickel-manganese composite hydroxide of the present embodiment. In the following, in describing FIG. 2, FIG. 1, which is a schematic diagram of an exemplary nickel-manganese composite hydroxide to be obtained, is referred to as appropriate.

As illustrated in FIG. 2, the method for producing the composite hydroxide 1 of the present embodiment includes a crystallization process that neutralizes and coprecipitates a salt containing at least nickel and a salt containing at least manganese in a reaction aqueous solution in a crystallization reaction tank. In the present embodiment, at this crystallization process, it is important to adjust a dissolved nickel concentration and a dissolved oxygen concentration in the reaction aqueous solution. By adjusting these factors (parameters), the crystallinity of the secondary particle 3 to be obtained and the degree of sparsity/density within the secondary particle 3 can each be controlled.

The inventors of the present invention intensively studied production conditions of the composite hydroxide 1 and have found out that the morphology of the primary particles 2 and the second particle 3 can be accurately controlled by adjusting the dissolved oxygen concentration in the reaction aqueous solution and the dissolved nickel concentration in the reaction aqueous solution. That is to say, the method of production of the present embodiment can produce a nickel-manganese composite hydroxide used suitably also as the precursor of the positive electrode active material by adjusting the dissolved nickel concentration in accordance with the dissolved oxygen concentration. The "morphology" refers to characteristics related to the form and structure of the primary particles 2 and/or the secondary particle 3 including the shape, the thickness (aspect ratio), the average particle diameter, the particle size distribution, the crystal structure, and the tap density of the particles.

That is to say, the dissolved oxygen concentration and the dissolved nickel concentration are adjusted to fall within respective specific ranges, whereby the precipitation rate of the primary particles 2 is adjusted to fall within an appropriate range, the thickness of the primary particles 2 is further increased so as to fill the void 4 among the primary particles 2, the secondary particle 3 having specific morphology (including the degree of sparsity/density) can be formed, and the particle diameter of the secondary particle 3 can be inhibited from increasing.

Furthermore, the method for producing the composite hydroxide 1 of the present embodiment controls a flocculated state of the primary particles 2 by stirring power in the reaction aqueous solution, whereby the morphology including the particle diameter of the secondary particle 2 can be controlled more accurately in a wide range. When the dissolved oxygen concentration is adjusted to fall within a low range, for example, the stirring power is controlled to fall within a high range, whereby coarse growth of the secondary particle 3 due to the flocculation of the primary particles 2 can be inhibited. In addition, the secondary particle 3 is inhibited from increasing in diameter, whereby the precipitation of the composite hydroxide within the secondary particle 3 is facilitated, and the secondary particle 3 can be made denser.

The composite hydroxide 1 obtained by controlling the crystallinity and the degree of sparsity/density of the secondary particle 3 to the desired ranges as described above is used for the precursor of the positive electrode active material, whereby the balance between the volume energy density and the output characteristics of the positive electrode active material can be designed to a desired range, and the positive electrode active material that achieves both of them at a high level can be obtained. The following describes conditions on the method of production of the present embodiment.

(Dissolved Oxygen Concentration)

The dissolved oxygen concentration in the reaction aqueous solution is adjusted to fall within a range of greater than 4.6 mg/L and up to 6.0 mg/L. The dissolved oxygen concentration is controlled to fall within the above range, whereby the degree of sparsity/density of the secondary particle 3 is controlled, and a composite hydroxide suitable as the precursor of the positive electrode active material can be obtained. During the crystallization process, the dissolved oxygen concentration is preferably controlled to fall within a certain range; fluctuations of the dissolved oxygen concentration are preferably within ±0.2 mg/L and more preferably within ±0.1 mg/L. The dissolved oxygen concentration can be measured by a method such as Winkler method (a chemical analysis method), a diaphragm permeation method (an electrochemical measurement method), or a fluorescence measurement method. As to the method for measuring the dissolved oxygen concentration, a similar measured value of the dissolved oxygen concentration can be obtained by any method described above, and thus any method described above may be used. The dissolved oxygen concentration in the reaction aqueous solution can be adjusted by introducing gas such as an inert gas (e.g., a $N_2$ gas or an Ar gas), air, or oxygen into the reaction tank and controlling the flow rate and/or composition of the gas. The gas may be flowed through space within the reaction tank or blown into the reaction aqueous solution.

Figure 4:
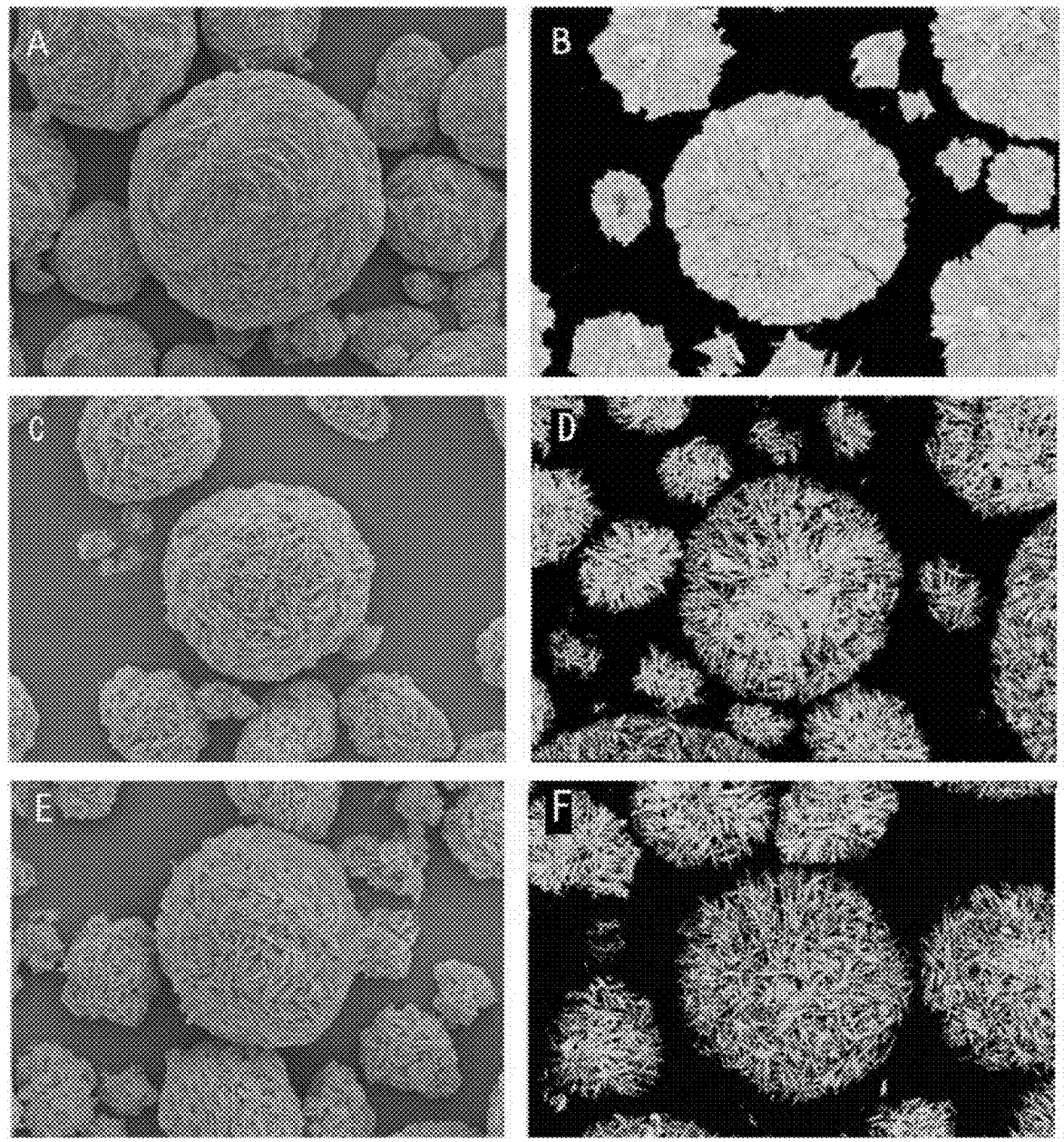
FIG. 4 is photographs of exemplary appearances and sections of the nickel-manganese composite hydroxide (Example 1 and Comparative Examples 1 and 3).

When the dissolved oxygen concentration is within the above range, as shown in FIG. 4C and FIG. 4D, for example, the composite hydroxide 1 having an appropriately sparse structure and having high filling density (tap density) can be obtained, and the positive electrode active material (FIG. 5C and FIG. 5D) obtained using this composite hydroxide 1 has an appropriately sparse structure and high filling density. Consequently, the obtained positive electrode active material can achieve both high energy density and excellent output characteristics at a high level. When the dissolved oxygen concentration is up to 4.6 mg/L, oxidation of transition metals, especially Mn among them is inhibited, and as shown in FIG. 4A and FIG. 4B, for example, the inside of the secondary particle 3 is likely to be dense, and the obtained positive electrode active material (FIG. 5A and FIG. 5B) also has a dense structure. When the dissolved oxygen concentration is greater than 6.0 mg/L, as shown in FIG. 4E and FIG. 4F, for example, the inside of the generated secondary particle 3 is likely to be sparse, and the obtained positive electrode active material (FIG. 5E and FIG. 5F) also has a sparse structure.

(Dissolved Nickel Concentration)

The dissolved nickel concentration in the reaction aqueous solution is adjusted to fall within a range of at least 300 mg/L and up to 800 mg/L, preferably a range of at least 400 mg/L and up to 800 mg/L, and more preferably a range of at least 400 mg/L and up to 700 mg/L based on the temperature of the reaction aqueous solution. The dissolved nickel concentration is adjusted as appropriate within the above range, whereby the particle diameter and the degree of sparsity/density can be controlled to fall within the above ranges, and a nickel-manganese composite hydroxide having particle form and high sphericity suitable as the precursor of the positive electrode active material can be easily obtained. During the crystallization process, the dissolved nickel concentration is preferably controlled to fall within a certain range; fluctuations of the dissolved nickel concentration are preferably within ±20 mg/L. The dissolved nickel concentration can be measured by chemically analyzing a Ni amount in a liquid component of the reaction aqueous solution by ICP emission spectrometry, for example.

When the dissolved nickel concentration in the reaction aqueous solution is lower than 300 mg/L, the growth rate of the primary particles is high and nucleation is predominant over particle growth, and thus the primary particles 2 are likely to be small and the degree of sparsity/density is likely to be higher than the above range. In contrast, when the dissolved nickel concentration is greater than 800 mg/L, the generation rate of the composite hydroxide 1 (the secondary particle 3) is lowered and the primary particles 2 grow within the secondary particle 3, and thus the degree of sparsity/density is likely to be lower than the above range. When the dissolved nickel concentration is extremely high, nickel remains in a filtrate, and the composition of the composite hydroxide 1 to be obtained may be substantially deviated from a target value. Furthermore, in a condition in which the dissolved nickel concentration is extremely high, the amount of impurities contained in the composite hydroxide 1 considerably increases, which may degrade battery characteristics when the positive electrode active material obtained from the composite hydroxide is used for a battery.

(Stirring Power)

The stirring power to be loaded on the reaction aqueous solution is more preferably adjusted to fall within a range of at least 2.0 kW/m$^3$ and up to 13.0 kW/m$^3$ and further preferably within a range of at least 3 kW/m$^3$ and up to 12.0 kW/m$^3$. The stirring power is made within the above range, whereby the secondary particle is inhibited from being made extremely finer or coarser, and the particle diameter of the composite hydroxide 1 can be more suitable as the positive electrode active material. During the crystallization process, the stirring power is preferably controlled to fall within a certain range; fluctuations of the stirring power are preferably within ±0.2 kW/m$^3$. The stirring power may be adjusted to fall within a range of up to 6.5 kW/m$^3$ and may be adjusted to fall within a range of up to 6.0 kW/m$^3$, for example. When the stirring power is less than 2 kW/m$^3$, the primary particles 2 are likely to be flocculated, which may form the secondary particle 3 increased in size. This may degrade the fillability of the positive electrode active material. In contrast, when the stirring power is greater than 13 kW/m$^3$, the flocculation of the primary particles is likely to be excessively inhibited, and the secondary particle 3 may be extremely small.

(Reaction Temperature)

The temperature of the reaction aqueous solution in the crystallization reaction tank is preferably within a range of at least 35° C. and up to 60° C. and more preferably within a range of at least 38° C. and up to 50° C. When the temperature of the reaction aqueous solution is greater than 60° C., the degree of priority of nucleation increases over particle growth in the reaction aqueous solution, and the shape of the primary particles 2 forming the composite hydroxide 1 is likely to be extremely fine. Use of such a composite hydroxide 1 causes a problem in that the fillability of the positive electrode active material to be obtained degrades. In contrast, when the temperature of the reaction aqueous solution is less than 35° C., particle growth tends to be preferential over nucleation in the reaction aqueous solution, and the shapes of the primary particles 2 and the secondary particle 3 forming the composite hydroxide 1 are likely to increase in size. Use of the composite hydroxide having such a coarse secondary particle 3 as the precursor of the positive electrode active material causes a problem in that the positive electrode active material containing so extremely large coarse particles that irregularities occur during electrode production is formed. Furthermore, the reaction aqueous solution being less than 35° C. causes a problem in that a remaining amount of metal ions in the reaction aqueous solution is large, and reaction efficiency is extremely bad and is likely to cause a problem in that a composite hydroxide containing a large amount of impurity elements is generated.

(pH Value)

The pH value of the reaction aqueous solution is preferably within a range of at least 10.0 and up to 13.0 with a liquid temperature of 25° C. as a basis. When the pH value is within the above range, the morphology of the secondary particle is appropriately controlled while controlling the degree of sparsity/density by appropriately controlling the size and shape of the primary particles 2, and thus the composite hydroxide 1 more suitable as the precursor of the positive electrode active material can be obtained. When the pH value is less than 10.0, the generation rate of the composite hydroxide 1 is extremely lowered, nickel remains in the filtrate, and the composition of the composite hydroxide 1 to be obtained may be substantially deviated from the target value. In contrast, when the pH value is greater than 13.0, the growth rate of the particles is high, nucleation is likely to occur, and particles with a small diameter and less sphericity are likely to be formed.

(Others)

The method of production of the present embodiment includes the crystallization process that generates nickel-manganese composite hydroxide particles by neutralizing salts containing at least nickel and manganese in the reaction aqueous solution. As a specific embodiment of the crystallization process, a neutralizer (e.g., an alkali solution) is added to a mixed aqueous solution containing at least nickel (Ni) and manganese (Mn) in the reaction tank while stirring at a constant speed to perform neutralization, whereby pH is controlled, and the composite hydroxide 1 particle can be generated through coprecipitation, for example. The method of production of the present embodiment can employ any method of a batch type method of crystallization and a continuous method of crystallization. The continuous method of crystallization is a method of crystallization that supplies a neutralizer while continuously suppling the mixed aqueous solution to control pH and collects composite hydroxide particles generated by overflow. The continuous method of crystallization obtains particles having wider particle size distribution and easily obtains particles having higher fillability than the batch method. In addition, the continuous method of crystallization is suitable for mass production and is an advantageous method of production also industrially. When the composite hydroxide 1 of the present embodiment described above is produced by the continuous method of crystallization, for example, the fillability (tap density) of the composite hydroxide 1 particle to be obtained can be improved, and the composite hydroxide 1 having higher fillability and an appropriate degree of sparsity/density can be produced simply and in a large amount.

For the mixed aqueous solution, an aqueous solution containing at least nickel and manganese, that is to say, an aqueous solution dissolving at least a nickel salt and a manganese salt can be used. Furthermore, the mixed aqueous solution may contain M, and an aqueous solution dissolving a salt containing a nickel salt, a manganese salt, and M may be used. For the salt containing a nickel salt, a manganese salt, and M, at least one selected from the group consisting of sulfates, nitrates, and chlorides can be used, for example. Among them, sulfates are preferably used in view of costs and liquid-waste treatment.

The concentration of the mixed aqueous solution is preferably at least 1.0 mol/L and up to 2.4 mol/L and more preferably at least 1.2 mol/L and up to 2.2 mol/L in terms of the total of the dissolved metal salts. When the concentration of the mixed aqueous solution is less than 1.0 mol/L in terms of the total of the dissolved metal salts, the concentration is extremely low, and the primary particles 2 forming the composite hydroxide 1 (the secondary particle 3) may fail to sufficiently grow. In contrast, when the concentration of the mixed aqueous solution is greater than 2.4 mol/L, it is greater than a saturated concentration at room temperature, and crystals are reprecipitated, which may cause the risk of clogging of piping or the like. In addition, in this case, the nucleation amount of the primary particles 2 increases, and the proportion of fine particles within the composite hydroxide particles to be obtained may increase. The composition of the metal elements contained in the mixed aqueous solution matches the concentration of the metal elements contained in the composite hydroxide 1 to be obtained. Consequently, the composition of the metal elements of the mixed aqueous solution can be prepared so as to match the composition of the metal elements of the target composite hydroxide 1.

Together with the neutralizer, a complexing agent may be added to the mixed aqueous solution. The complexing agent is not limited to a particular agent and may be any one that can form a complex through bonding to metal elements such as nickel ions and manganese ions in an aqueous solution; examples of the complexing agent include an ammonium ion supplier. For the ammonium ion supplier, which is not limited to a particular substance, at least one selected from the group consisting of ammonia water, an aqueous ammonium sulfate solution, and an aqueous ammonium chloride solution can be used, for example. Among them, ammonia water is preferably used in view of handleability. When the ammonium ion supplier is used, the concentration of ammonium ions is preferably within a range of at least 5 g/L and up to 25 g/L.

For the neutralizer, an alkali solution can be used; general aqueous alkali metal hydroxide solutions such as sodium hydroxide and potassium hydroxide can be used, for example. Among them, an aqueous sodium hydroxide solution is preferably used in view of costs and handleability. Although an alkali metal hydroxide can be directly added to the reaction aqueous solution, it is preferably added as an aqueous solution in view of easiness of pH control. In this case, the concentration of the aqueous alkali metal hydroxide solution is preferably at least 12% by mass and up to 30% by mass and more preferably at least 20% by mass and up to 30% by mass. When the concentration of the aqueous alkali metal hydroxide solution is less than 12% by mass, a supply amount to the reaction tank increases, and particles may fail to sufficiently grow. In contrast, when the concentration of the aqueous alkali metal hydroxide solution is greater than 30% by mass, the pH value increases locally at an addition position of the alkali metal hydroxide, and fine particles may be generated.

The method of production of the present embodiment preferably includes a washing process after the crystallization process. The washing process is a process that washes away impurities contained in the composite hydroxide 1 obtained in the crystallization process. For a washing solution, pure water is preferably used. The amount of the washing solution is preferably at least 1 L relative to 300 g of the composite hydroxide 1. When the amount of the washing solution is less than 1 L relative to 300 g of the composite hydroxide 1, washing is insufficient, and the impurities may remain in the composite hydroxide 1. As to a method of washing, the washing solution such as pure water may be passed through a filter such as a filter press, for example. When $SO_4$ remaining in the composite hydroxide 1 is desired to be further washed away, sodium hydroxide, sodium carbonate, or the like is preferably used as the washing solution.

(3) Positive Electrode Active Material for Nonaqueous Electrolyte Secondary Battery The positive electrode active material of the present embodiment includes a lithium-nickel-manganese composite oxide (hereinafter, also referred to as a "lithium-metal composite oxide") represented by General Formula (2): $Li_{1+t}Ni_xMn_yM_zO_{2+\beta}$ (in Formula (2), M is at least one element selected from Co, Ti, V, Cr, Zr, Nb, Mo, Hf, Ta, Fe, and W; t satisfies $-0.05 \le t \le 0.5$, x satisfies $0.1 \le x \le 0.9$, y satisfies $0.05 \le y \le 0.8$, z satisfies $0 \le z \le 0.8$, and $x+y+z=1.0$; and β satisfies $0 \le \beta \alpha \le 0.5$) and containing a secondary particle formed of flocculated primary particles. In Formula (2), β is a coefficient that changes in accordance with the valence number of the metal elements other than lithium contained in the lithium-metal composite oxide and the atom number ratio of lithium to the metal elements other than lithium.

As described below, the positive electrode active material is formed by mixing the composite hydroxide 1 described above and a lithium compound together and firing the mixture. Consequently, the composition of the lithium-metal composite oxide is substantially the same as that of the composite hydroxide 1 except lithium. In Formula (2), y and z preferably satisfy $0.1 \le y \le 0.8$ and, when M is Co, preferably satisfy $0.1 \le z \le 0.4$ for the same reason as y and z of Formula (1), for example.

The positive electrode active material of the present embodiment uses the composite hydroxide 1 the crystallinity and the degree of sparsity/density of which are controlled as the precursor and can thereby achieve high energy density and excellent output characteristics at a high level. Although the positive electrode active material mainly includes the secondary particle formed of flocculated primary particles, it may contain a small amount of single primary particles similarly to the composite hydroxide 1. The positive electrode active material may contain other lithium-metal composite oxides apart from the lithium-metal composite oxide of the present embodiment to the extent that the effects of the present invention are not impaired. The following describes characteristics of the positive electrode active material.

The positive electrode active material has a degree of sparsity/density of at least 10% and up to 25% and preferably of at least 15% and up to 25%. When the degree of sparsity/density is within the above range, the electrolyte solution penetrates the inside of the secondary particle and can thereby obtain a secondary battery having high battery capacity and output characteristics and having high fillability with the dense secondary particle. Consequently, when this positive electrode active material is used for a secondary battery, a secondary battery achieving both high energy density and excellent output characteristics at a high level can be obtained. The "degree of sparsity/density" is a value represented by [(the area of a void within a cross section area of the secondary particle/the cross section area of the secondary particle)×100](%) obtained from a result of image analysis of a SEM image of a section of the secondary particle similarly to the composite hydroxide 1 particle, for example.

A DBP absorption amount measured in compliance with JIS K6217-4:2008 (hereinafter, also referred to as an "oil absorption amount") of the positive electrode active material is greater than 20 $cm^3/100$ g and up to 28 $cm^3/100$ g. When the oil absorption amount is within the above range, when the positive electrode active material is used for a positive electrode of a battery, a sufficient amount of the electrolyte solution can be held within the positive electrode, movement of lithium ions via the electrolyte solution is not limited, and excellent output characteristics and sufficient battery capacity can be obtained.

The positive electrode material has a ratio I(003)/I(104) of diffraction peak intensity I(003) of a 003 plane to peak intensity I(104) of a 104 plane by X-ray diffraction measurement (hereinafter, also referred to as a "peak intensity ratio") preferably of at least 1.7 and more preferably of at least 1.7 and up to 2.5. When the peak intensity ratio is within the above range, the positive electrode active material is high in crystallinity and is excellent in battery capacity and output characteristics.

The tap density of the positive electrode material is preferably within a range of at least 1.6 $g/cm^3$ and up to 2.3 $g/cm^3$ and preferably within a range of at least 1.7 $g/cm^3$ and up to 2.0 $g/cm^3$. When the tap density is within the above range, the positive electrode material achieves both excellent battery capacity and fillability, and battery energy density can be further improved.

The positive electrode active material has a volume-average particle diameter MV preferably of at least 5 μm and up to 20 μm and more preferably of at least 6 μm and up to 15 μm. When the volume-average particle diameter MV is within the above range, the specific surface area is inhibited from reducing while fillability is maintained at a high level, and a battery using this positive electrode active material can achieve both high filling density and excellent output characteristics.

Furthermore, the positive electrode active material preferably has [(D90−D10)/an average particle diameter] indicating a particle diameter variation index of at least 0.70. When the variation index of the nickel-manganese composite hydroxide is within the above range, fine particles and coarse particles appropriately mix, and particle fillability can be improved while the cycle characteristics and output characteristics of the positive electrode active material to be obtained are inhibited from degrading. In view of inhibiting excessive mixing of fine particles or coarse particles into the positive electrode active material, the variation index of the positive electrode active material is preferably up to 1.2 and more preferably up to 1.0.

(4) Method for Producing Positive Electrode Active Material for Nonaqueous Electrolyte Secondary Battery A method for producing a positive electrode active material of the present embodiment is a method for producing a positive electrode active material for a nonaqueous electrolyte secondary battery, the positive electrode active material including a lithium-nickel-manganese composite oxide represented by General Formula (2): $Li_{1+t}Ni_xMn_yM_zO_{2+\beta}$ (in Formula (2), M is at least one element selected from Co, Ti, V, Cr, Zr, Nb, Mo, Hf, Ta, Fe, and W; $-0.05 \le t \le 0.5$, $0.1 \le x \le 0.9$, $0.05 \le y \le 0.8$, $0 \le z \le 0.8$, and $x+y+z=1.0$; and $0 \le \beta \le 0.5$) and containing a secondary particle formed of flocculated primary particles.

Figure 3:
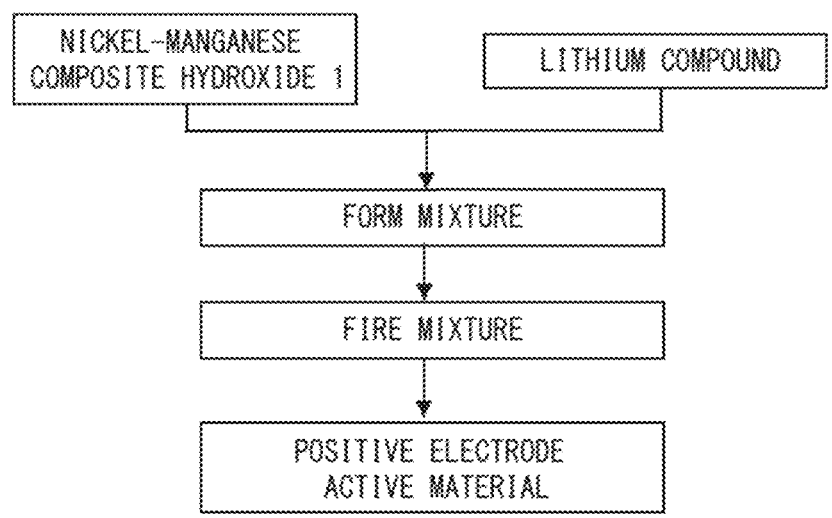
FIG. 3 is a diagram of an exemplary method for producing a lithium-nickel-manganese composite oxide.

FIG. 3 is a diagram of an example of the method for producing a positive electrode active material of the present embodiment. As illustrated in FIG. 3, the method for producing a positive electrode active material includes a process of obtaining a mixture by mixing the composite hydroxide 1 and a lithium compound together and a firing process of obtaining a lithium-metal composite oxide by firing the mixture. The morphology of the composite oxide is strongly influenced by the morphology of the composite hydroxide 1 as a precursor. For this reason, the powder characteristics of the composite hydroxide 1 are adjusted to fall within the specific ranges as described above, whereby the powder characteristics of the lithium-metal composite oxide can be controlled to fall within the specific ranges. The following describes the processes.

(Mixing Process)

First, the composite hydroxide 1 and the lithium compound are mixed together to form a lithium mixture. The lithium compound is not limited to a particular compound, and known lithium compounds can be used; preferred examples thereof include lithium hydroxide, lithium nitrate, lithium carbonate, and mixtures thereof in view of availability. Among them, for the lithium compound, lithium hydroxide and lithium carbonate are more preferred in view of handleability and quality stability. The composite hydroxide 1 may be oxidized to be the form of a nickel-manganese composite oxide before the mixing process and then be mixed.

The composite hydroxide 1 and the lithium compound are mixed together such that the ratio (Li/Me) between the atom number of metals other than lithium in the lithium mixture, that is to say, the sum (Me) of the atom numbers of nickel, cobalt, and an additional element (M) and the atom number (Li) of lithium is at least 0.95 and up to 1.50 and preferably at least 0.95 and up to 1.20. That is to say, Li/Me does not change before and after firing, and the Li/Me ratio mixed in this mixing process is a Li/Me ratio in the positive electrode active material, and Li/Me in the lithium mixture is mixed so as to be the same as Li/Me in the positive electrode active material to be obtained.

For mixing, general mixers can be used; examples thereof include shaker mixers, Loedige mixers, Julia mixers, and V blenders. Mixing may be performed sufficiently to the extent that the skeleton of the composite hydroxide 1 is not destroyed.

(Firing Process)

Next, the lithium compound is fired to obtain a lithium-nickel-manganese composite oxide. The firing is performed in an oxidative atmosphere at at least 700° C. and up to 1,100° C. When the firing temperature is less than 700° C., firing is not sufficiently performed, and the tap density may reduce. In addition, when the firing temperature is less than 700° C., diffusion of lithium does not sufficiently proceed, surplus lithium remains, and a crystal structure may fail to be well-regulated, or the uniformity of the composition of nickel, manganese, and the like within the particle cannot be sufficiently obtained, and sufficient characteristics cannot necessarily be obtained when used for a battery. In contrast, when the firing temperature is greater than 1,100° C., a sparse part on a particle surface is made dense. In addition, sintering may fiercely occur among particles of the lithium-nickel-manganese composite oxide, abnormal particle growth may occur, and consequently, particles after firing may increase in size and may fail to hold their substantially spherical particle form. Such a positive electrode active material reduces in the specific surface area and thus causes a problem in that the resistance of a positive electrode increases to reduce battery capacity when used for a battery. The time for firing, which is not limited to a particular time, is about at least 1 hour and up to 24 hours.

In view of uniformly conducting a reaction of the composite hydroxide 1 or the nickel-manganese composite oxide obtained by oxidizing it and the lithium compound, the temperature is preferably raised up to the firing temperature with a temperature raising rate within a range of at least 1° C./min and up to 10° C./min, for example. Furthermore, before firing, the lithium compound is held at a temperature near the melting point of the lithium compound for about 1 hour to 10 hours, whereby the reaction can be conducted more uniformly.

In the method for producing a positive electrode active material of the present embodiment, the hydroxide used may contain single primary particles 2 such as a primary particle 2 that has not been flocculated as the secondary particle 3 and a primary particle 2 that has fallen from the secondary particle 3 after being flocculated other than the composite hydroxide 1 including the secondary particle 3 formed of the flocculated primary particles 2. The composite hydroxide used may contain a composite hydroxide produced by a method other the method described above or a composite oxide obtained by oxidizing the composite hydroxide to the extent that the effects of the present invention are not impaired.

(5) Nonaqueous Electrolyte Secondary Battery

The following describes an example of a nonaqueous electrolyte secondary battery (hereinafter, also referred to as a "secondary battery") of the present embodiment for each component. The secondary battery of the present embodiment includes a positive electrode, a negative electrode, and a nonaqueous electrolyte solution and includes components similar to those of general lithium ion secondary batteries. The embodiment described below is only by way of example, and the nonaqueous electrolyte secondary battery can be performed with forms to which various modifications and improvements have been made based on the knowledge of those skilled in the art including the following embodiment. The secondary battery is not limited to particular uses.

(Positive Electrode)

Using the positive electrode active material 10, the positive electrode of the nonaqueous electrolyte secondary battery is produced. The following describes an example of a method for manufacturing the positive electrode. First, the positive electrode active material 10 (powdery), an electric conductor, and a binding agent (binder) are mixed together, activated carbon as needed and a solvent for viscosity adjustment or the like are further added thereto, and this mixture is kneaded to produce a positive electrode mixture paste.

The mixture ratio of the materials in the positive electrode mixture is a factor for determining the performance of a lithium secondary battery and can thus be adjusted in accordance with uses. The mixture ratio of the materials can be similar to that of a positive electrode of known lithium secondary batteries; when the total mass of the solid content of the positive electrode mixture excluding the solvent is 100% by mass, 60 to 95% by mass of the positive electrode active material, 1 to 20% by mass of the electric conductor, and 1 to 20% by mass of the binding agent can be contained, for example.

The obtained positive electrode mixture paste is applied to the surface of a collector made of aluminum foil and is dried to scatter the solvent to produce a sheet-shaped positive electrode, for example. As needed, pressurizing may be performed using a roll press or the like in order to increase electrode density. The thus obtained sheet-shaped positive electrode is cut or the like into appropriate size in accordance with a target battery to be served for production of the battery. However, the method for producing the positive electrode is not limited to the exemplified one and may be another method.

Examples of the electric conductor include graphite (natural graphite, artificial graphite, expanded graphite, and the like) and carbon black materials such as acetylene black and Ketjen black.

Examples of the binding agent (binder), which plays a role of binding active material particles, include polyvinylidene fluoride (PVDF), polytetrafluoroethylene (PTFE), fluoro rubber, ethylene-propylene rubber, styrene butadiene, cellulosic resins, and polyacrylic acid.

As needed, a solvent for dispersing the positive electrode active material, the electric conductor, and the activated carbon and dissolving the binding agent is added to the positive electrode mixture. Specific examples of the solvent include organic solvents such as N-methyl-2-pyrrolidone. The activated carbon can be added to the positive electrode mixture in order to increase electric double layer capacity.

(Negative Electrode)

Examples of the negative electrode include metal lithium, lithium alloys. The negative electrode may be formed by applying a negative electrode mixture obtained by mixing a binding agent with a negative electrode active material that can occlude and desorb lithium ions and adding an appropriate solvent to be paste form to the surface of a metal foil collector such as copper, drying, and compressing it in order to increase electrode density as needed.

Examples of the negative electrode active material include natural graphite, artificial graphite, organic compound fired bodies such as phenol resin, and powder of carbon substances such as coke. In this case, examples of a negative electrode binding agent include fluorine-containing resins such as PVDF similarly to the positive electrode. Examples of a solvent in which the active material and the binding agent are dispersed include organic solvents such as N-methyl-2-pyrrolidone.

(Separator)

A separator is interposed between the positive electrode and the negative electrode. The separator separates the positive electrode and the negative electrode from each other and holds an electrolyte; examples thereof include thin films formed of polyethylene, polypropylene, or the like, the films having many minute holes.

(Nonaqueous Electrolyte Solution)

A nonaqueous electrolyte solution is a solution obtained by dissolving a lithium salt as a supporting salt in an organic solvent. Examples of the organic solvent include cyclic carbonates such as ethylene carbonate, propylene carbonate, butylene carbonate, and trifluoro propylene carbonate; chain carbonates such as diethyl carbonate, dimethyl carbonate, ethylmethyl carbonate, and dipropyl carbonate; ether compounds such as tetrahydrofuran, 2-methyltetrahydrofuran, and dimethoxy ethane; sulfur compounds such as ethylmethyl sulfone and butane sulfone; and phosphorous compounds such as triethyl phosphate and trioctyl phosphate; for the solvent, one or two or more in combination selected from the above can be used.

Examples of the supporting salt include $LiPF_6$, $LiBF_4$, $LiClO_4$, $LiAsF_6$, $LiN(CF_3SO_2)_2$ and their composite salts. Furthermore, the nonaqueous electrolyte solution may contain radical scavengers, surfactants, fire retardants, and the like.

(Shape and Configuration of Battery)

The nonaqueous electrolyte secondary battery of the present invention including the positive electrode, the negative electrode, the separator, and the nonaqueous electrolyte solution described above can be formed into various shapes such as cylindrical and stacked shapes. For any shape employed, the positive electrode and the negative electrode are stacked via the separator to form an electrode body, the obtained electrode body is impregnated with the nonaqueous electrolyte solution, a positive electrode collector and a positive electrode terminal communicating with the outside and a negative electrode collector and a negative electrode terminal communicating with the outside are each connected using a collector lead, and the electrode body is hermetically sealed in a battery case to complete the nonaqueous electrolyte secondary battery.

EXAMPLES

The following describes specific examples of the present invention. The present invention, however, is not limited to these examples.

Example 1

[Production of Composite Hydroxide]

A prescribed amount of pure water was put into a reaction tank (60 L), and stirring power was adjusted to 5.5 kW/m³. Next, the temperature (liquid temperature) in the reaction tank was set to 45° C. while stirring. In this process, a nitrogen gas ($N_2$) was supplied to the reaction tank, and a $N_2$ flow rate was adjusted so as to give a dissolved oxygen concentration in the liquid in the reaction tank of 5.8 mg/L. Simultaneously and continuously added to this reaction tank were a 2.0 mol/L mixed aqueous solution dissolving nickel sulfate, cobalt sulfate, and manganese sulfate so as to give a molar ratio among nickel:cobalt:manganese of 35:35:30, a 25% by mass aqueous sodium hydroxide solution as an alkali solution, and a 25% by mass ammonia water as a complexing agent to perform a neutralization crystallization reaction. A pH value and an ammonium ion concentration were adjusted so as to give a dissolved nickel concentration of 410 mg/L. In this process, the ammonium ion concentration in the reaction tank was in a range of 12 to 15 g/L. The flow rate of the total of the mixed solution, the aqueous sodium hydroxide solution, and the ammonia water was controlled so as to give a residence time of the metal salts contained in the mixed aqueous solution of 8 hours. The neutralization crystallization reaction in the reaction tank stabilized, then slurry containing a nickel-cobalt-manganese composite hydroxide was collected from an overflow port and was subjected to suction filtration to obtain a cake of a nickel-manganese composite hydroxide. After filtration, the nickel-manganese composite hydroxide cake present within the filter was subjected to suction filtration with 1 L of pure water for 140 g of the nickel-manganese composite hydroxide cake being supplied and was passed therethrough to wash away impurities. Furthermore, the nickel-manganese composite hydroxide cake after being washed was dried in the air at 120° C. to obtain a nickel-manganese composite hydroxide.

The particle size distribution of the obtained nickel-manganese composite hydroxide was measured using a laser diffraction scattering type particle size distribution measurement apparatus. Consequently, the volume-average particle diameter MV was 10.1 μm, and [(D90−D10)/the average particle diameter] was 0.85. The pore volume was measured by a nitrogen adsorption method. Consequently, the pore volume was 0.056 cm³/g. The tap density was measured using a tapping apparatus (KYT 3000 manufactured by Seishin Enterprise Co., Ltd.) and was calculated from a volume and a sample weight after 500 times of tapping. Consequently, the tap density was 1.50 g/cm³. The specific surface area was measured by a BET method by nitrogen adsorption. Consequently, the specific surface area was 14.7 m²/g. The half width of the (001) plane of the nickel-manganese composite hydroxide was determined by X-ray diffraction measurement to be 0.428. The diffraction peak of the (001) plane appears near 2θ=19° (2θ=19±1°).

A surface and a sectional structure of the obtained nickel-manganese composite hydroxide were observed with a scanning electron microscope. FIGS. 4C and D show the surface (4C) and the sectional structure (4D) of the obtained nickel-manganese composite hydroxide. The result of surface observation revealed that a secondary particle having high sphericity formed of plate-shaped primary particles was obtained. The result of sectional observation revealed a structure in which an appropriate void was present within the particle. For the evaluation of the degree of sparsity/density, a particle cross section area and a void area within the cross section area of the particle were determined using image analysis software (WinRoof 6.1.1), and the degree of sparsity/density was calculated from the expression [(the void area within the particle)/(the particle cross section area)×100](%). The degrees of sparsity/density of the respective particles determined for secondary particles with a particle diameter of at least 5 μm (N=20) were number-averaged to calculate the degree of sparsity/density (average degree of sparsity/density) of the nickel-manganese composite hydroxide to be 19.0%.

The obtained nickel-manganese composite hydroxide was dissolved with an inorganic acid and was subjected to chemical analysis by ICP emission spectrometry, and it was revealed that its composition was $Ni_{0.35}Co_{0.35}Mn_{0.30}(OH)_2$ and that particles with a target composition were obtained. Table 1 lists characteristics of the obtained nickel-manganese composite hydroxide.

[Production of Positive Electrode Active Material]

The above nickel-manganese composite hydroxide and lithium carbonate were weighed so as to give a Li/Me of 1.06 and were thoroughly mixed together using a shaker mixer (TURBULA Type T2C manufactured by Willy A. Bachofen (WAB)) with strength to the extent that the skeleton of the precursor was maintained to obtain a lithium mixture (the mixing process).

This lithium mixture was inserted into a firing vessel made of magnesia, and using an enclosed electric furnace, the temperature was raised up to 950° C. at a temperature rising rate of 2.77° C./min in the atmosphere with a flow rate of 12 L/min and was held for 10 hours, and the lithium mixture was subjected to furnace cooling to room temperature to obtain a lithium-transition metal composite oxide (the firing process).

A surface and a sectional structure of the obtained lithium-nickel-manganese oxide were observed with a scanning electron microscope, and it was revealed that particles having good sphericity were obtained similarly to the nickel-manganese composite hydroxide. Similarly to the nickel-manganese composite hydroxide, particle size distribution measurement was performed on the obtained positive electrode active material. It was revealed that the average particle diameter was 9.3 μm and that [(D90–D10)/the average particle diameter] was 0.82. The oil absorption amount and the tap density were measured to be 26.9 cm$^3$/100 g and 1.94 g/cm$^3$, respectively.

Figure 5:
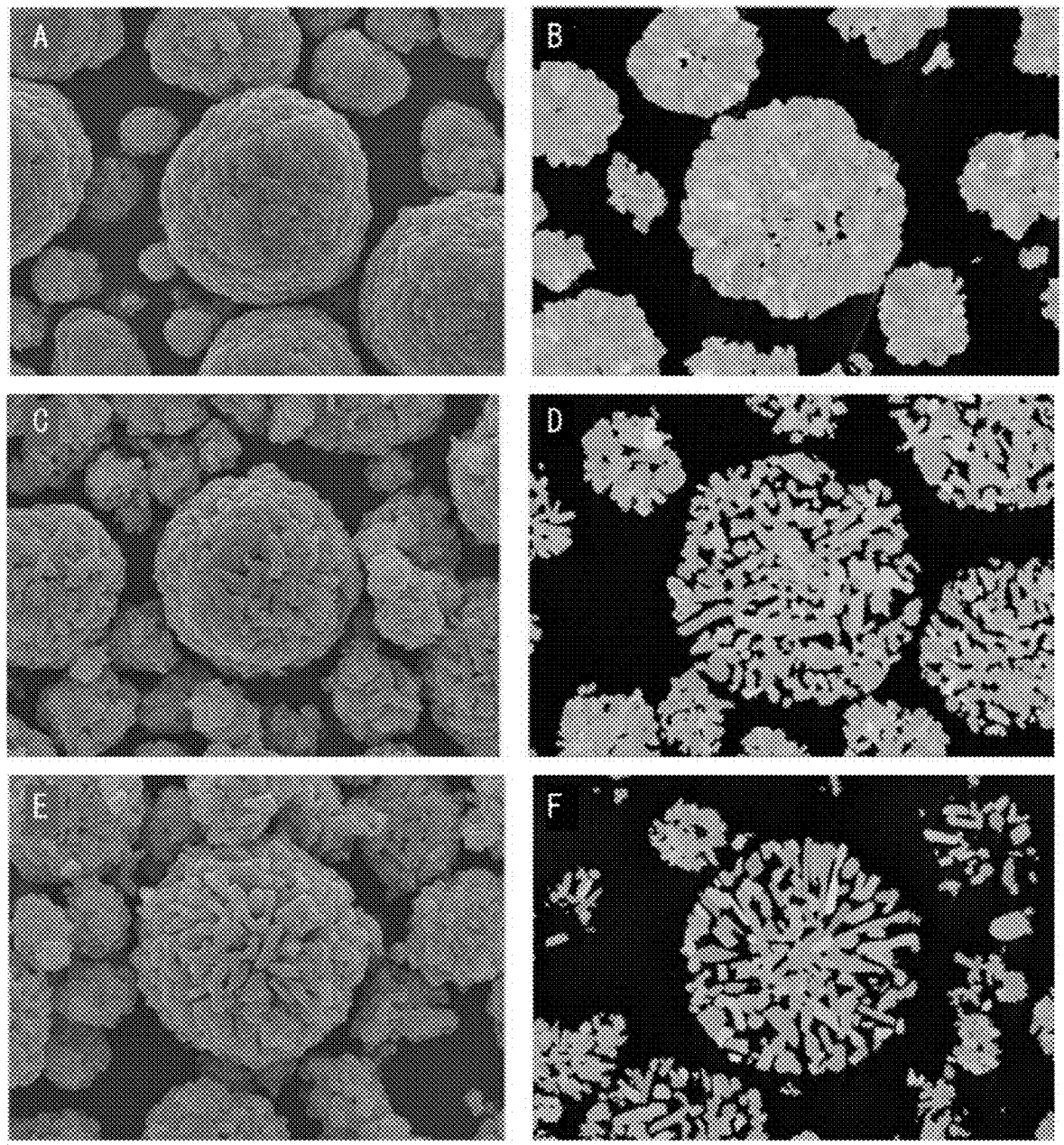
FIG. 5 is photographs of exemplary appearances and sections of a positive electrode active material (Example 1 and Comparative Examples 1 and 3)

A surface and a sectional structure of the obtained positive electrode active material were observed with a scanning electron microscope. FIGS. 5C and D show the surface (FIG. 5C) and the sectional structure (FIG. 5D) of the obtained positive electrode active material. It was revealed that a secondary particle having a void formed of plate-shaped primary particles similar to the shape of the nickel-manganese composite hydroxide was obtained. The result of sectional observation revealed a structure having an appropriate void within the particle. The degree of sparsity/density was calculated similarly to the nickel-manganese composite hydroxide from the result of sectional observation to be 21.1%.

The obtained positive electrode active material was dissolved with an inorganic acid and was subjected to chemical analysis by ICP emission spectrometry, and it was revealed that its composition was $Li_{1.06}Ni_{0.35}Co_{0.35}Mn_{0.30}O_2$ and that particles with a target composition were obtained. Table 2 lists characteristics of the obtained positive electrode active material.

[Production of Battery]

Figure 6:
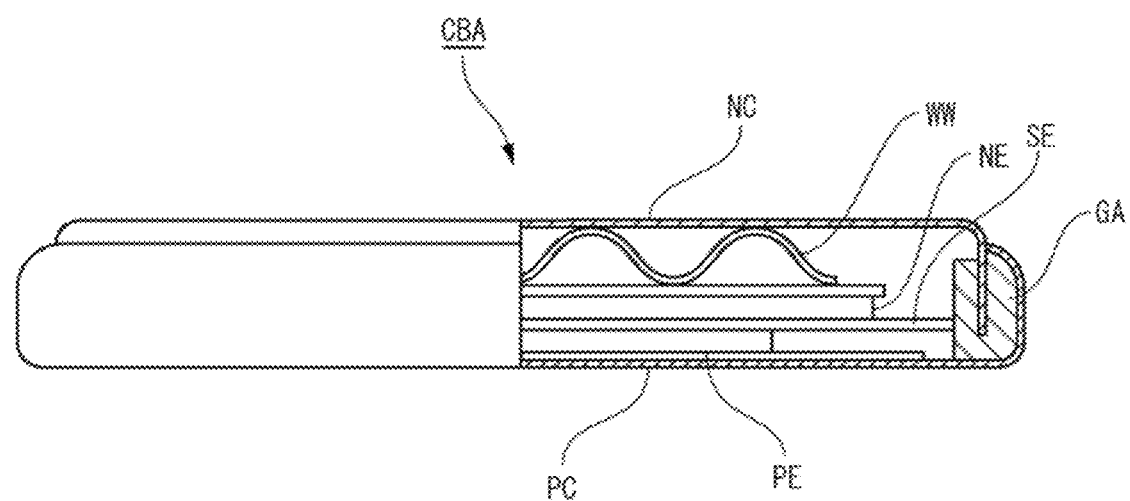
FIG. 6 is a schematic sectional view of a coin-type battery used for the evaluation of battery characteristics.

Mixed together were 52.5 mg of the obtained positive electrode active material, 15 mg of acetylene black, and 7.5 mg of a polytetrafluoroethylene resin (PTFE), the resultant mixture was press-formed at a pressure of 100 MPa to a diameter of 11 mm and a thickness of 100 μm to form a positive electrode (an electrode for evaluation) PE illustrated in FIG. 6. The produced positive electrode PE was dried in a vacuum drier at 120° C. for 12 hours, and then using this positive electrode PE, a 2032 type coin battery CBA was produced in a glove box in an Ar atmosphere and the dew point of which was controlled to −80° C. For a negative electrode NE, lithium (Li) metal with a diameter of 17 mm and a thickness of 1 mm was used. For an electrolyte solution, a liquid mixture of an equivalent amount of ethylene carbonate (EC) and diethyl carbonate (DEC) with 1 M $LiClO_4$ as a supporting electrolyte (manufactured by Tomiyama Pure Chemical Industries, Ltd.) was used. For a separator SE, a polyethylene porous film with a film thickness of 25 μm was used. The coin battery has a gasket GA and a wave washer WW, and the coin-type battery was assembled with a positive electrode can PC and a negative electrode can NC.

Figure 7:
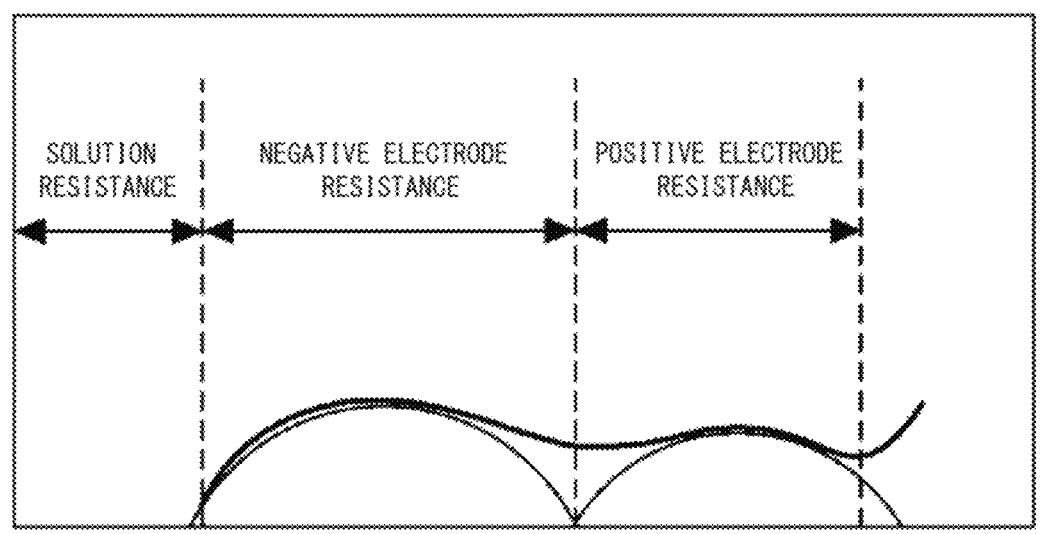
FIG. 7 is a diagram of an exemplary Nyquist plot obtained by an AC impedance method.
Figure 8:
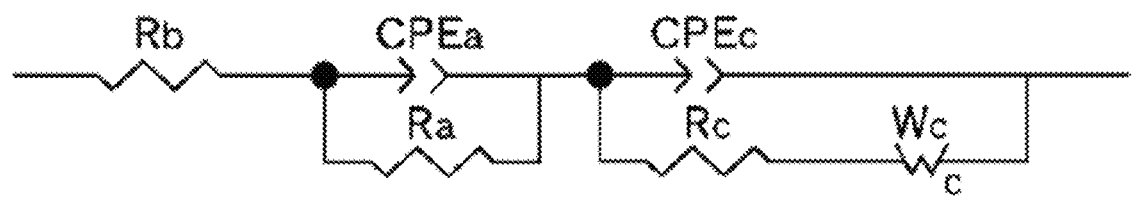
FIG. 8 is a schematic illustrative diagram of an equivalent circuit used for the analysis of impedance evaluation.

An initial discharging capacity was determined as follows: the produced coin-type battery was allowed to stand for about 24 hours, was charged to a cutoff voltage 4.3 V with a current density to the positive electrode of 0.1 mA/cm$^2$ after an open circuit voltage (OCV) stabilized, and was discharged to a cutoff voltage 3.0 V after a one-hour suspension; and the capacity at this time was taken as the initial discharging capacity. For the measurement of the discharging capacity, a multi-channel voltage/current generator (R6741A manufactured by Advantest Corporation) was used. For reaction resistance, the coin-type battery was adjusted to have a measurement temperature and charged at a charge potential of 4.1 V, and then a resistance value was measured by an AC impedance method. For the measurement, using a frequency response analyzer and a potentiogalvanostat (1255B manufactured by Solartron), a Nyquist plot illustrated in FIG. 7 was created, and fitting calculation was performed using an equivalent circuit illustrated in FIG. 8 to calculate a value of positive electrode resistance (the reaction resistance). From the result of charging/discharging measurement, a discharge voltage was calculated, and from this value, the tap density, and the initial discharging capacity, volume energy density was calculated from the expression Volume energy density (Wh/L)=average discharge voltage (V)×discharging capacity (A/kg)×tap density (kg/L). Table 2 lists measurement results of the initial charging and discharging capacities, the positive electrode resistance value, and the volume energy density of the obtained active material.

Example 2

A nickel-manganese composite hydroxide and a positive electrode active material were produced similarly to Example 1 except that the $N_2$ flow rate was adjusted so as to give a dissolved oxygen concentration in the crystallization process of 5.0 mg/L. Table 1 lists characteristics of the obtained nickel-manganese composite hydroxide. Table 2 lists characteristics and electrochemical characteristic evaluation results of the obtained positive electrode active material. The evaluations were performed similarly to those in Example 1.

Example 3

A nickel-manganese composite hydroxide and a positive electrode active material were produced similarly to Example 1 except that the $N_2$ flow rate was adjusted so as to give a dissolved oxygen concentration in the crystallization process of 5.0 mg/L and that the ammonium ion concentration was controlled so as to give a dissolved nickel concentration in the reaction aqueous solution of 600 mg/L. Table 1 lists characteristics of the obtained nickel-manganese composite hydroxide. Table 2 lists characteristics and electrochemical characteristic evaluation results of the obtained positive electrode active material. The evaluations were performed similarly to those in Example 1.

Example 4

[Production of Composite Hydroxide]

A prescribed amount of pure water was put into a reaction tank (60 L), and stirring power was adjusted to 5.8 kW/m$^3$. Next, the temperature (liquid temperature) in the reaction tank was set to 45° C. while stirring. In this process, a nitrogen gas ($N_2$) was supplied to the reaction tank, and a $N_2$ flow rate was adjusted so as to give a dissolved oxygen concentration in the liquid in the reaction tank of 5.9 mg/L. Simultaneously and continuously added to this reaction tank were a 2.0 mol/L mixed aqueous solution dissolving nickel sulfate, cobalt sulfate, and manganese sulfate so as to give a molar ratio among nickel:cobalt:manganese of 60:20:20, a 25% by mass aqueous sodium hydroxide solution as an alkali solution, and a 25% by mass ammonia water as a complexing agent to perform a neutralization crystallization reaction. A pH value and an ammonium ion concentration were adjusted so as to give a dissolved nickel concentration of 360 mg/L. In this process, the ammonium ion concentration in the reaction tank was in a range of 12 to 15 g/L. The flow rate of the total of the mixed solution, the aqueous sodium hydroxide solution, and the ammonia water was controlled so as to give a residence time of the metal salts contained in the mixed aqueous solution of 8 hours. The neutralization crystallization reaction in the reaction tank stabilized, then slurry containing a nickel-cobalt-manganese composite hydroxide was collected from an overflow port and was subjected to suction filtration to obtain a cake of a nickel-manganese composite hydroxide. After filtration, the nickel-manganese composite hydroxide cake present within the filter was subjected to suction filtration with 1 L of pure water for 140 g of the nickel-manganese composite hydroxide cake being supplied and was passed therethrough to wash away impurities. Furthermore, the nickel-manganese composite hydroxide cake after being washed was dried in the air at 120° C. to obtain a nickel-manganese composite hydroxide (a nickel-cobalt-manganese composite hydroxide). Table 1 lists characteristics of the obtained nickel-cobalt-manganese composite hydroxide.

[Production of Positive Electrode Active Material]

The above nickel-manganese composite hydroxide and lithium carbonate were weighed so as to give a Li/Me of 1.025 and were thoroughly mixed together using a shaker mixer (TURBULA Type T2C manufactured by Willy A. Bachofen (WAB)) with strength to the extent that the skeleton of the precursor was maintained to obtain a lithium mixture (the mixing process).

This lithium mixture was inserted into a firing vessel made of magnesia, and using an enclosed electric furnace, the temperature was raised up to 950° C. at a temperature rising rate of 2.77° C./min in the atmosphere with a flow rate of 12 L/min, was held for 10 hours, and was subjected to furnace cooling to room temperature to obtain a lithium-transition metal composite hydroxide (the firing process). Table 2 lists characteristics and electrochemical characteristic evaluation results of the obtained positive electrode active material. The evaluations were performed similarly to those in Example 1.

Comparative Example 1

A nickel-cobalt-manganese composite hydroxide and a positive electrode active material were produced similarly to Example 1 except that the stirring power in the crystallization process was adjusted to 6.0 kW/m$^3$ and that the N$_2$ flow rate and the pH value were adjusted so as to give a dissolved nickel concentration of 1,080 mg/L and a dissolved oxygen concentration of 2.8 mg/L in the reaction aqueous solution. Table 1 lists characteristics of the obtained nickel-cobalt-manganese composite hydroxide, and FIG. 4A and FIG. 4B show a surface and a sectional structure thereof, respectively. Table 2 lists characteristics and electrochemical characteristic evaluation results of the obtained positive electrode active material, and FIG. 5A and FIG. 5B show a surface and a sectional structure thereof, respectively. The evaluations were performed similarly to those in Example 1.

Comparative Example 2

A nickel-cobalt-manganese composite hydroxide and a positive electrode active material were produced similarly to Example 1 except that the stirring power in the crystallization process was adjusted to 5.8 kW/m$^3$ and that the N$_2$ flow rate and the pH value were adjusted so as to give a dissolved nickel concentration of 970 mg/L and a dissolved oxygen concentration of 4.5 mg/L in the reaction aqueous solution. The evaluations were performed similarly to those in Example 1.

Comparative Example 3

A nickel-cobalt-manganese composite hydroxide and a positive electrode active material were produced similarly to Example 1 except that the stirring power in the crystallization process was adjusted to 5.2 kW/m$^3$ and that air was supplied in place of N$_2$, and the flow rate thereof and the pH value were adjusted so as to give a dissolved nickel concentration of 300 mg/L and a dissolved oxygen concentration of 6.2 mg/L in the reaction aqueous solution. Table 1 lists characteristics of the obtained nickel-cobalt-manganese composite hydroxide, and FIG. 4E and FIG. 4F show a surface and a sectional structure thereof, respectively. Table 2 lists characteristics and electrochemical characteristic evaluation results of the obtained positive electrode active material, and FIG. 5E and FIG. 5F show a surface and a sectional structure thereof, respectively. The evaluations were performed similarly to those in Example 1.

TABLE 1

| | | | Example 1 | Example 2 | Example 3 | Example 4 | Comparative Example 1 | Comparative Example 2 | Comparative Example 3 |
|---|---|---|---|---|---|---|---|---|---|
| Crystallization process | Dissolved Ni concentration | (mg/L) | 410 | 410 | 600 | 360 | 1080 | 970 | 300 |
| | Dissolved oxygen concentration | (mg/L) | 5.8 | 5.0 | 5.0 | 5.9 | 2.8 | 4.5 | 6.2 |
| | Stirring power | (kW/m3) | 5.5 | 5.5 | 5.5 | 5.8 | 6.0 | 5.8 | 5.2 |
| | Crystallization temperature | (° C.) | 45 | 45 | 45 | 45 | 45 | 45 | 45 |
| | pH | — | 12.0 | 12.0 | 12.0 | 11.8 | 11.6 | 11.7 | 12.1 |
| Composite hydroxide | (001) plane half width | (°) | 0.428 | 0.403 | 0.396 | 0.352 | 0.283 | 0.367 | 0.487 |
| | Average particle diameter MV | (μm) | 10.1 | 9.8 | 10.8 | 11.5 | 10.1 | 10.2 | 10.1 |
| | Degree of sparsity/density | (%) | 19.0 | 17.6 | 17.8 | 16.6 | 1.8 | 4.1 | 24.8 |
| | Pore volume | (cm3/g) | 0.056 | 0.051 | 0.049 | 0.058 | 0.013 | 0.021 | 0.061 |
| | (D90 − D10)/MV | — | 0.85 | 0.86 | 0.88 | 1.03 | 0.78 | 0.82 | 0.91 |
| | Specific surface area | (m2/g) | 14.7 | 14.0 | 13.6 | 13.2 | 5.8 | 12.2 | 18.5 |
| | Tap density | (g/cm3) | 1.50 | 1.55 | 1.62 | 1.78 | 2.12 | 1.95 | 1.21 |
| | Composition | — | Ni0.35Co0.35Mn0.30(OH)2 | | | Ni0.60Co0.20Mn0.20(OH)2 | Ni0.35Co0.35Mn0.30(OH)2 | | |

TABLE 2

| | | Example 1 | Example 2 | Example 3 | Example 4 | Comparative Example 1 | Comparative Example 2 | Comparative Example 3 |
|---|---|---|---|---|---|---|---|---|
| Production process | Li/Me ratio | — | 1.06 | 1.06 | 1.06 | 1.025 | 1.06 | 1.06 | 1.06 |
| | Firing temperature | (° C.) | 950 | 950 | 950 | 900 | 950 | 950 | 950 |
| Lithium-metal composite oxide | Composition | — | $Li_{1.06}Ni_{0.35}Mn_{0.30}Co_{0.35}O_2$ | | | $Li_{1.03}Ni_{0.60}Mn_{0.20}Co_{0.20}O_2$ | $Li_{1.06}Ni_{0.35}Mn_{0.30}Co_{0.35}O_2$ | | |
| | Average particle diameter MV | (μm) | 9.3 | 9.7 | 10.8 | 11.1 | 9.6 | 9.8 | 9.2 |
| | Degree of sparsity/density | (%) | 21.1 | 18.3 | 18.9 | 12.8 | 1.0 | 1.9 | 27.9 |
| | Tap density | (g/cm3) | 1.94 | 2.01 | 2.10 | 2.20 | 2.40 | 2.32 | 1.59 |
| | Oil absorption amount | (cm3/100 g) | 26.9 | 24.3 | 24.8 | 20.3 | 15.6 | 17.7 | 33.3 |
| | (D90 − D10)/MV | — | 0.82 | 0.85 | 0.89 | 1.00 | 0.80 | 0.81 | 0.91 |
| | I(003)/I(104) | — | 1.91 | 1.89 | 1.85 | 1.71 | 1.92 | 1.89 | 1.96 |
| Battery characteristics | Initial charging capacity | (mAh/g) | 176.8 | 176.2 | 175.8 | 196.1 | 175.2 | 175.8 | 177.5 |
| | initial discharging capacity | (mAh/g) | 163.1 | 162.5 | 162.2 | 179.0 | 158.8 | 161.0 | 164.4 |
| | Volume energy density | (Wh/L) | 1212 | 1251 | 1305 | 1508 | 1460 | 1431 | 1001 |
| | Reaction resistance | (Ω) | 2.16 | 2.20 | 2.25 | 2.16 | 2.65 | 2.40 | 1.98 |

(Evaluation Results)

In Examples 1 to 4, the dissolved oxygen concentration, the dissolved nickel concentration, and the stirring power are adjusted to optimum values, providing a nickel-manganese composite hydroxide having high reactivity with Li and appropriate sparsity/density. The results of the pore volume and the average degree of sparsity/density also indicate that the particles described above are obtained. The positive electrode active material synthesized from such a nickel-manganese composite hydroxide is excellent in particle fillability and has an appropriate degree of sparsity/density similarly to the nickel-manganese composite hydroxide and can thus achieve both high battery capacity and excellent output characteristics at a high level.

In Comparative Examples 1 and 2, the dissolved nickel concentration is high and the dissolved oxygen concentration is low, and thus the particles have a smaller half width of the (001) plane and a smaller pore volume and average degree of sparsity/density than the nickel-manganese composite hydroxides of the examples. Consequently, the output characteristics are lower than in the examples, although the volume energy density is high.

In Comparative Example 3, the dissolved nickel concentration is low and the dissolved oxygen concentration is high, and thus the sparse particles have a larger half width and a higher pore volume and average degree of sparsity/density than the nickel-manganese composite hydroxides of the examples. Consequently, the particle fillability is lower than in the examples. The positive electrode active material synthesized from such a nickel-manganese composite hydroxide is lower in volume energy density than in the examples, although it is low in the reaction resistance and is excellent in output characteristics.

From the foregoing, the dissolved nickel concentration, the dissolved oxygen concentration, and the stirring power are adjusted to the optimum values, whereby a nickel-manganese composite hydroxide being excellent in particle fillability and having an appropriate degree of sparsity/density can be obtained. Such a nickel-manganese composite hydroxide is used, whereby a positive electrode active material that has high battery capacity and can achieve both high volume energy density and excellent output characteristics can be obtained.

The technical scope of the present invention is not limited to the aspects described in the embodiment and the like. One or more of the requirements described in the embodiment and the like may be omitted. The requirements described in the embodiment and the like can be combined as appropriate. Japanese Patent Application No. 2016-150506 and all the literature cited in this specification are herein incorporated by reference in their entirety to the extent allowed by law.

DESCRIPTION OF REFERENCE SIGNS

1 Nickel-manganese composite hydroxide
2 Primary particle
3 Secondary particle
4 Void
d Particle diameter of secondary particle
PE Positive electrode (electrode for evaluation)
NE Negative electrode
SE Separator
GA Gasket
WW Wave washer
PC Positive electrode can
NC Negative electrode can

The invention claimed is:

1. A nickel-manganese composite hydroxide represented by General Formula (1): $Ni_xMn_yM_z(OH)_{2+\alpha}$ (in Formula (1), M is at least one element selected from Co, Ti, V, Cr, Zr, Nb, Mo, Hf, Ta, Fe, and W; x satisfies $0.1 \leq x \leq 0.9$, y satisfies $0.05 \leq y \leq 0.8$, z satisfies $0 \leq z \leq 0.8$, and $x+y+z=1.0$; and α satisfies $0 \leq \alpha \leq 0.4$) and containing a secondary particle formed of a plurality of flocculated primary particles, wherein the nickel-manganese composite hydroxide has a half width of a diffraction peak of a (001) plane obtained by X-ray diffraction measurement of at least 0.35° and up to 0.50° and has a degree of sparsity/density represented by [(a void area within a cross section area of the secondary particle/the cross section area of the secondary particle)×100](%) within a range of greater than 10% and up to 22%.

2. The nickel-manganese composite hydroxide according to claim 1, wherein a pore volume of the nickel-manganese composite hydroxide measured by a nitrogen adsorption method is at least 0.03 cm$^3$/g and up to 0.06 cm$^3$/g.

3. The nickel-manganese composite hydroxide according to claim 1, wherein [(D90−D10)/a volume-average particle diameter MV] as an indicator indicating a spread of particle size distribution of the nickel-manganese composite hydroxide is at least 0.7, and the volume-average particle diameter MV is at least 5 μm and up to 20 μm.

4. The nickel-manganese composite hydroxide according to claim 1, wherein a specific surface area of the nickel-manganese composite hydroxide is at least 10 m$^2$/g and up to 20 m$^2$/g.

5. The nickel-manganese composite hydroxide according to claim 1, wherein a tap density of the nickel-manganese composite hydroxide is at least 1.2 g/cm$^3$ and up to 2.2 g/cm$^3$.

6. A method for producing a nickel-manganese composite hydroxide represented by General Formula (1): $Ni_xMn_yM_z(OH)_{2+\alpha}$ (in Formula (1), M is at least one element selected from Co, Ti, V, Cr, Zr, Nb, Mo, Hf, Ta, Fe, and W; x satisfies 0.1≤x≤0.9, y satisfies 0.05≤y≤0.8, z satisfies 0≤z≤0.8, and x+y+z=1.0; and a satisfies 0≤α≤0.4) and containing a secondary particle formed of a plurality of flocculated primary particles,
the method comprising a crystallization process of generating a nickel-manganese composite hydroxide by neutralizing a salt containing at least nickel and a salt containing at least manganese in a reaction aqueous solution, wherein
in the crystallization process, a dissolved oxygen concentration in the reaction aqueous solution is adjusted to fall within a range of greater than 4.6 mg/L and up to 6.0 mg/L, and a dissolved nickel concentration in the reaction aqueous solution is adjusted to fall within a range of at least 300 mg/L and up to 800 mg/L.

7. The method for producing the nickel-manganese composite hydroxide according to claim 6, wherein in the crystallization process, a stirring power is adjusted to fall within a range of at least 2.0 kW/m$^3$ and up to 13 kW/m$^3$.

8. The method for producing the nickel-manganese composite hydroxide according to claim 6, wherein in the crystallization process, a temperature of the reaction aqueous solution is adjusted to fall within a range of at least 35° C. and up to 60° C.

9. The method for producing the nickel-manganese composite hydroxide according to claim 6, wherein in the crystallization process, a pH value measured with a liquid temperature of the reaction aqueous solution of 25° C. as a basis is adjusted to fall within a range of at least 10.0 and up to 13.0.

10. The method for producing the nickel-manganese composite hydroxide according to claim 6, wherein the crystallization process includes overflowing slurry containing nickel-manganese composite hydroxide particles generated through neutralization by continuously adding a mixed aqueous solution containing nickel and manganese to a reaction tank and collecting the particles.

11. A positive electrode active material for a nonaqueous electrolyte secondary battery, the positive electrode active material comprising:
a lithium-nickel-manganese composite oxide represented by General Formula (2): $Li_{1+t}Ni_xMn_yM_zO_{2+\beta}$ (in Formula (2), M is at least one element selected from Co, Ti, V, Cr, Zr, Nb, Mo, Hf, Ta, Fe, and W; t satisfies −0.05≤t≤0.5, x satisfies 0.1≤x≤0.9, y satisfies 0.05≤y≤0.8, z satisfies 0≤z≤0.8, and x+y+z=1.0; and β satisfies 0≤β≤0.5) and containing a secondary particle formed of flocculated primary particles, wherein
the positive electrode active material for a nonaqueous electrolyte secondary battery has a degree of sparsity/density represented by [(a void area within a cross section area of the secondary particle/the cross section area of the secondary particle)×100](%) of at least 10% and up to 25% and has a DBP absorption amount measured in compliance with JIS K6217-4:2008 of greater than 20 cm$^3$/100 g and up to 28 ml/100 g.

12. The positive electrode active material for the nonaqueous electrolyte secondary battery according to claim 11, wherein the positive electrode active material has a tap density of at least 1.6 g/cm$^3$ and up to 2.0 g/cm$^3$.

13. The positive electrode active material for the nonaqueous electrolyte secondary battery according to claim 11, wherein a ratio I(003)/I(104) of diffraction peak intensity I(003) of a 003 plane to peak intensity I(104) of a 104 plane by X-ray diffraction measurement is at least 1.7.

14. A method for producing a positive electrode active material for a nonaqueous electrolyte secondary battery, the positive electrode active material including a lithium-nickel-manganese composite oxide represented by General Formula (2): $Li_{1+t}Ni_xMn_yM_zO_{2+\beta}$ (in Formula (2), M is at least one element selected from Co, Ti, V, Cr, Zr, Nb, Mo, Hf, Ta, Fe, and W; t satisfies −0.05≤t≤0.5, x satisfies 0.1≤x≤0.9, y satisfies 0.05≤y≤0.8, z satisfies 0≤z≤0.8, and x+y+z=1.0; and β satisfies 0≤β≤0.5) and containing a secondary particle formed of flocculated primary particles, the method comprising:
a process of obtaining a mixture by mixing the nickel-manganese composite hydroxide according to claim 1 and a lithium compound together; and
a process of obtaining the lithium-nickel-manganese composite oxide by firing the mixture.

15. The method for producing the positive electrode active material for the nonaqueous electrolyte secondary battery according to claim 14, wherein the nickel-manganese composite hydroxide is obtained by the method comprising a crystallization process of generating a nickel-manganese composite hydroxide by neutralizing a salt containing at least nickel and a salt containing at least manganese in a reaction aqueous solution, and
wherein in the crystallization process, a dissolved oxygen concentration in the reaction aqueous solution is adjusted to fall within a range of greater than 4.6 mg/L and up to 6.0 mg/L, and a dissolved nickel concentration in the reaction aqueous solution is adjusted to fall within a range of at least 300 mg/L and up to 800 mg/L.

16. A nonaqueous electrolyte secondary battery comprising a positive electrode which comprises the positive electrode active material according to claim 11.

* * * * *